Figure 10:
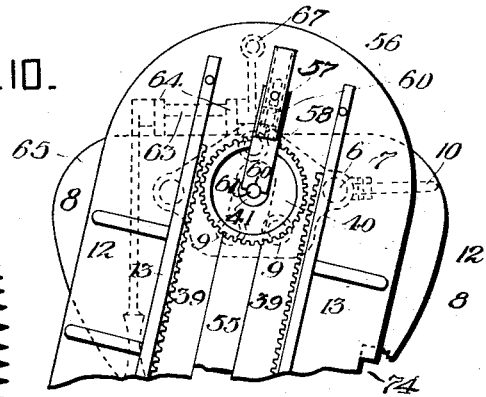

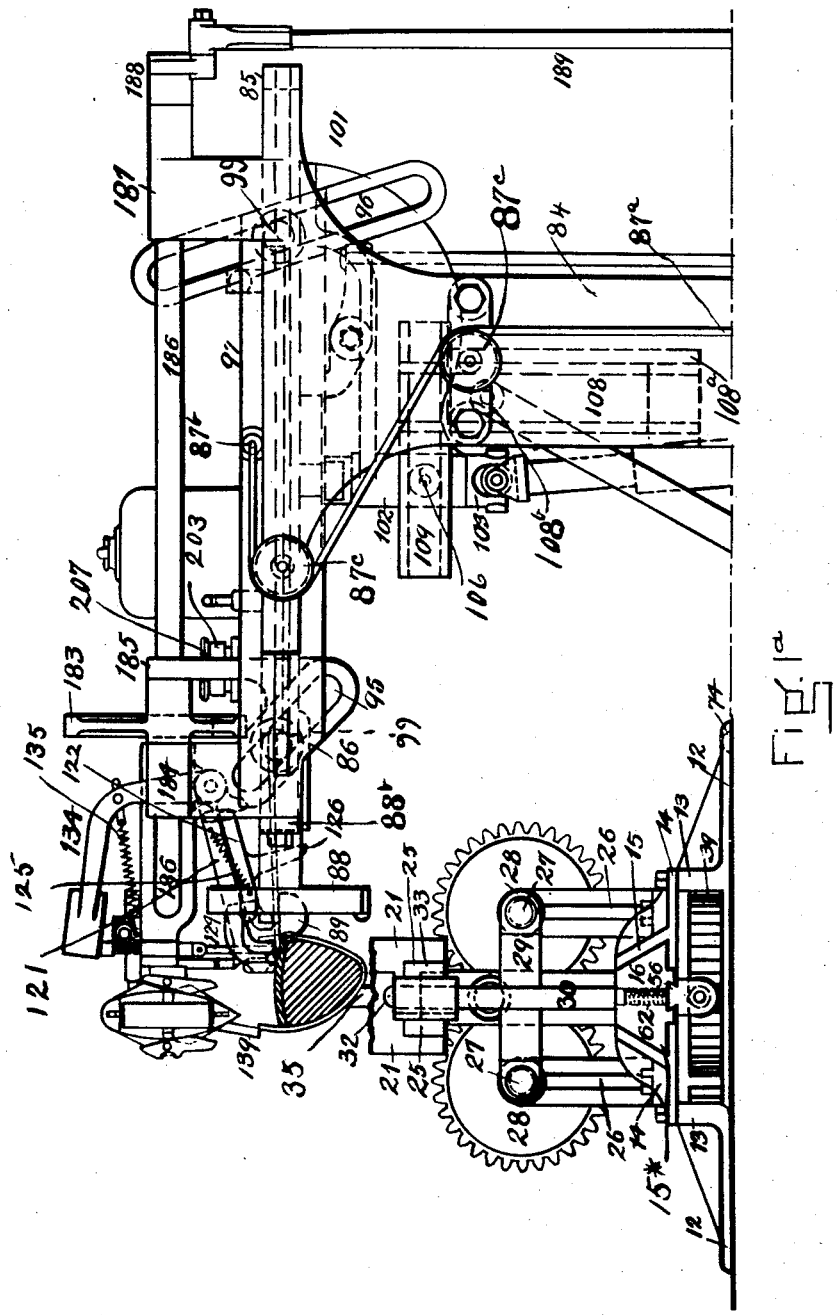

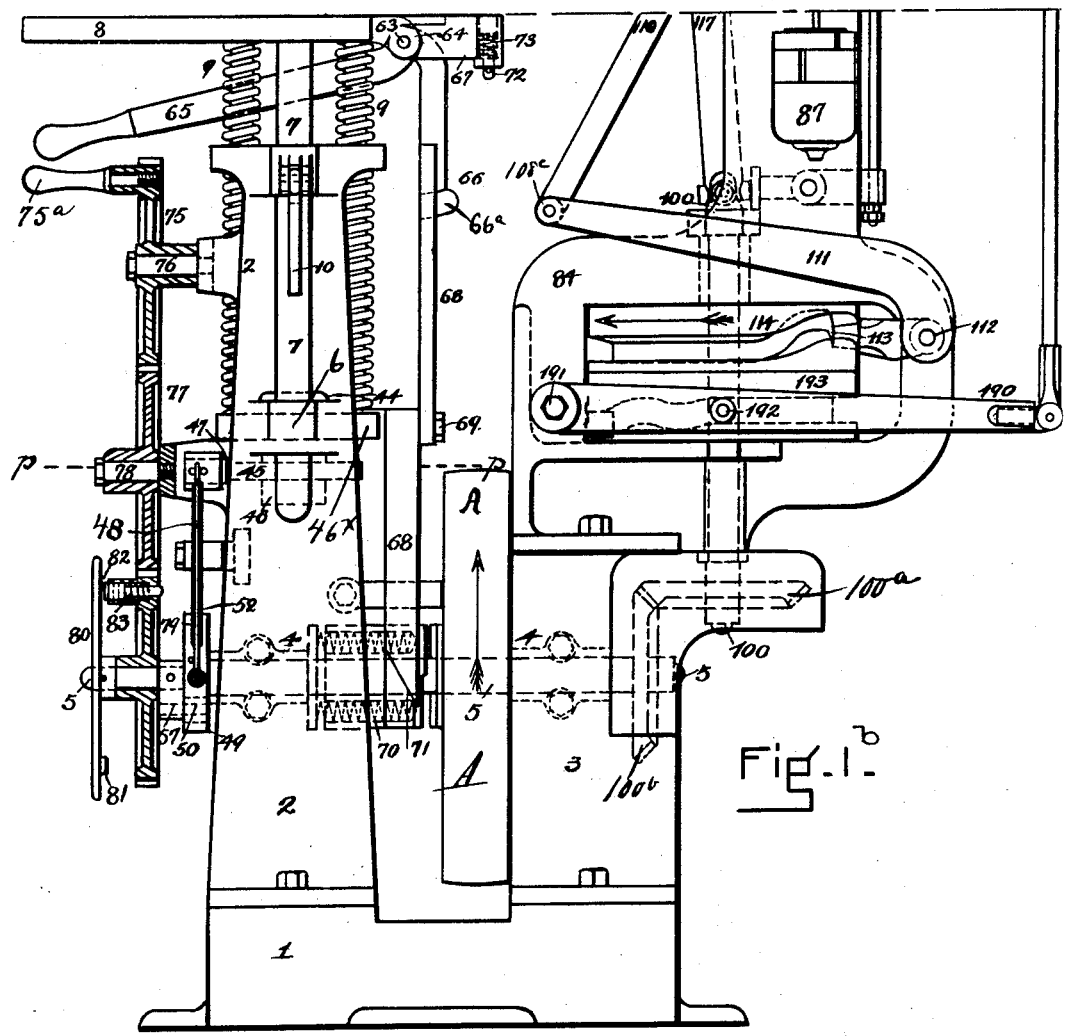

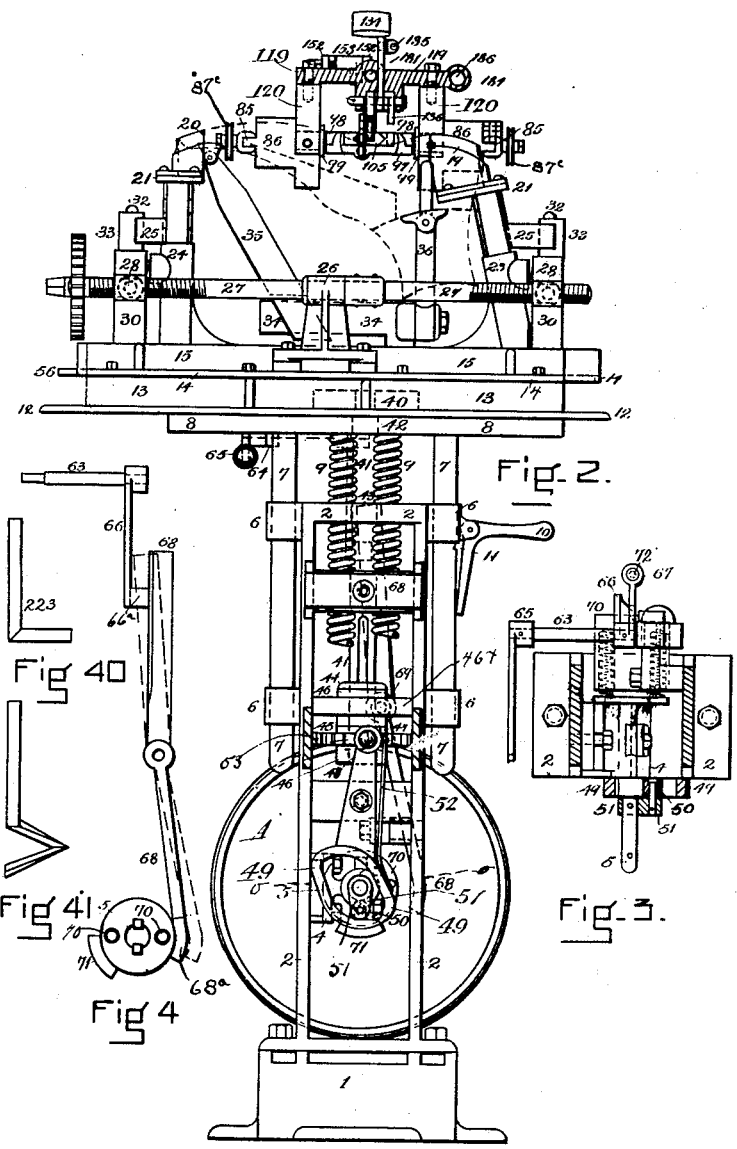

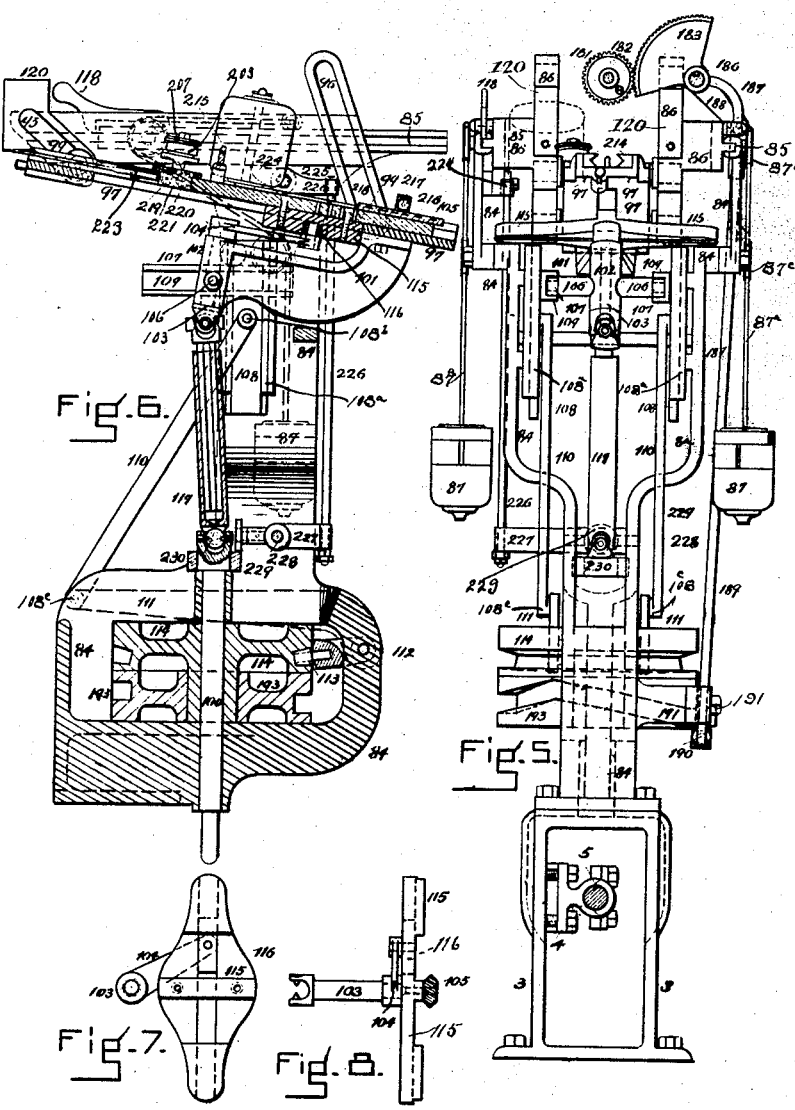

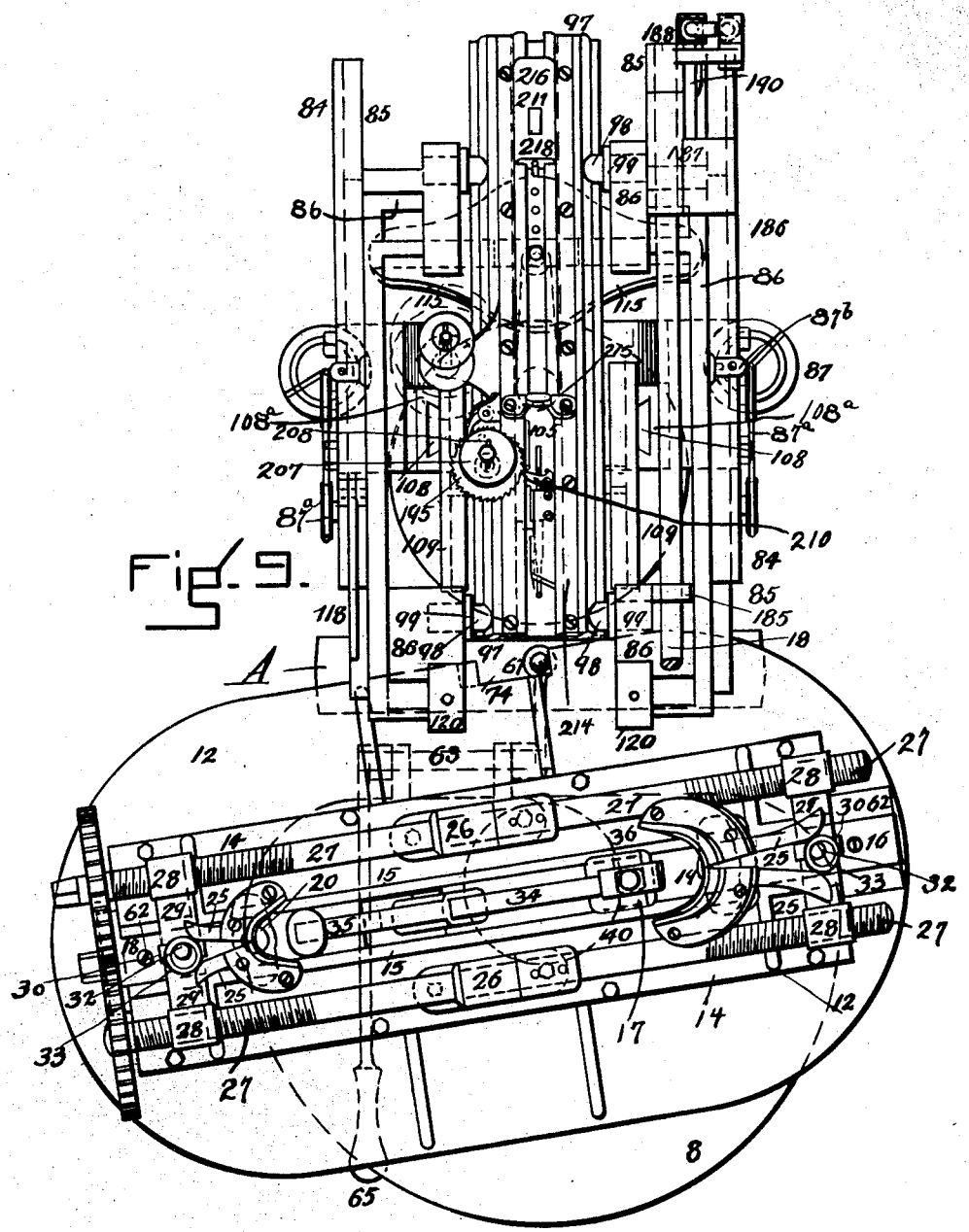

J. E. CRISP.
LASTING MACHINE.
APPLICATION FILED DEC. 6, 1894.

1,110,422.

Patented Sept. 15, 1914.
4 SHEETS—SHEET 6.

WITNESSES
Horace Van Everen
Fred O. Fish

INVENTOR
Joseph E. Crisp
by his Attorney
Benjamin Phillips

J. E. CRISP.
LASTING MACHINE.
APPLICATION FILED DEC. 6, 1894.
1,110,422.
Patented Sept. 15, 1914.
14 SHEETS—SHEET 7.
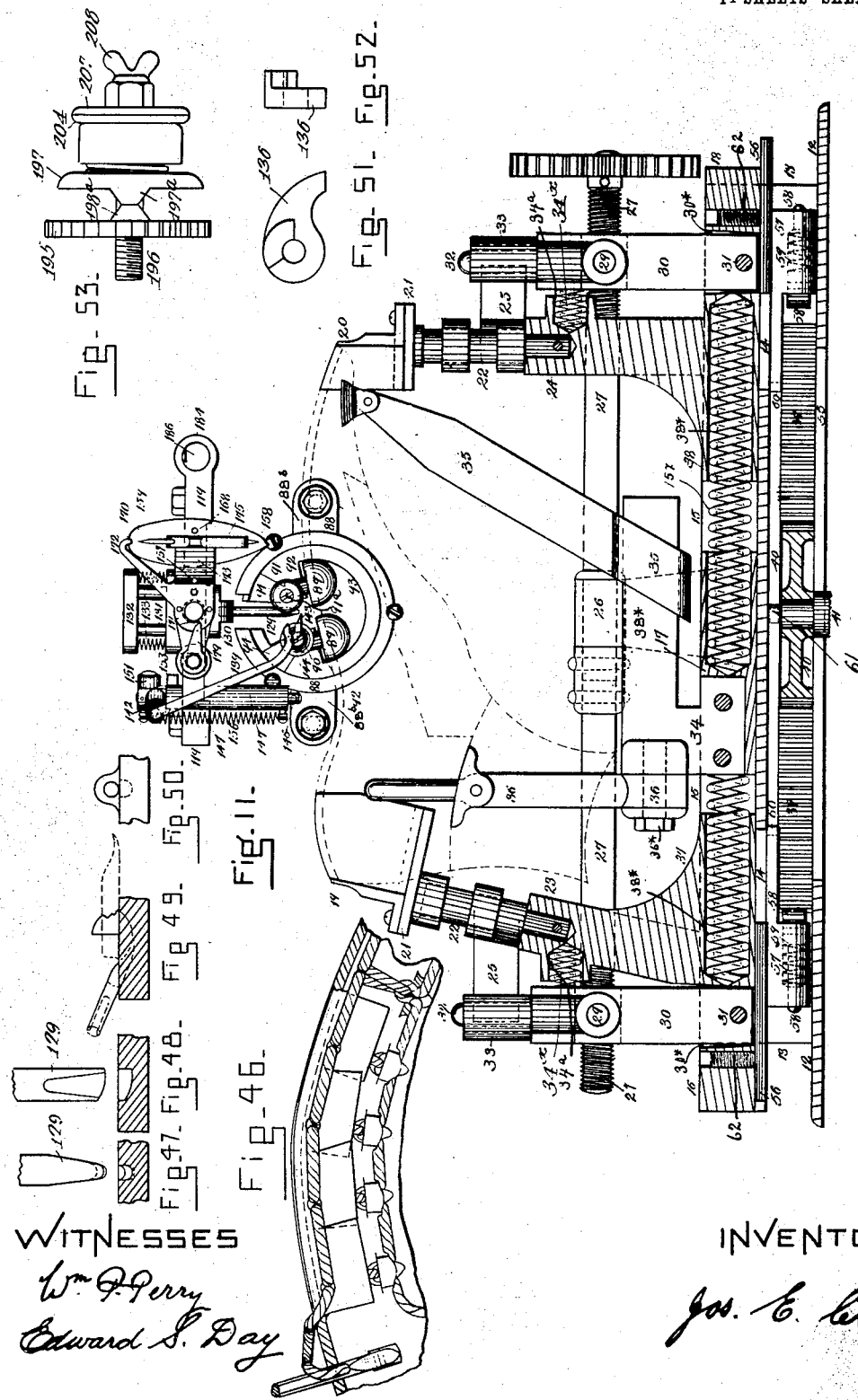
WITNESSES
Wm. F. Perry
Edward S. Day
INVENTOR
Jos. E. Crisp.

J. E. CRISP.
LASTING MACHINE.
APPLICATION FILED DEC. 6, 1894.

1,110,422.

Patented Sept. 15, 1914.
14 SHEETS—SHEET 8.

WITNESSES
Wm F. Perry
Edward S. Day

INVENTOR
Jos. E. Crisp

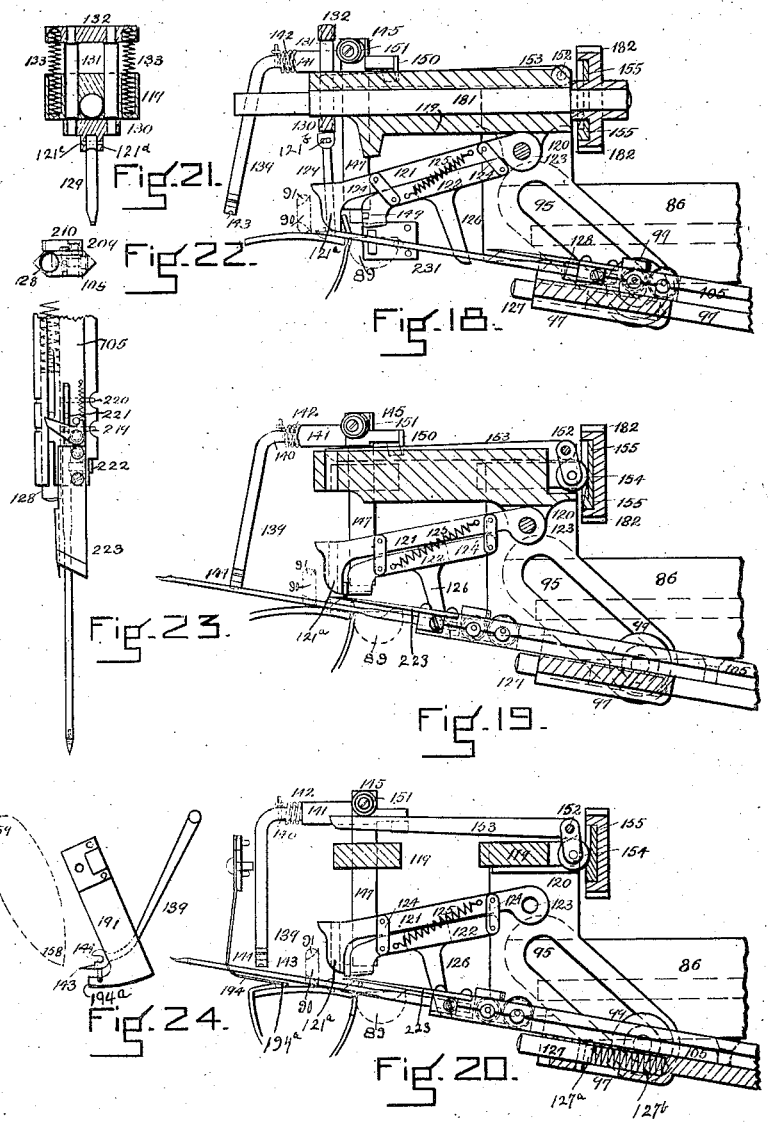

J. E. CRISP.
LASTING MACHINE.
APPLICATION FILED DEC. 6, 1894.
1,110,422.
Patented Sept. 15, 1914.
14 SHEETS—SHEET 10.
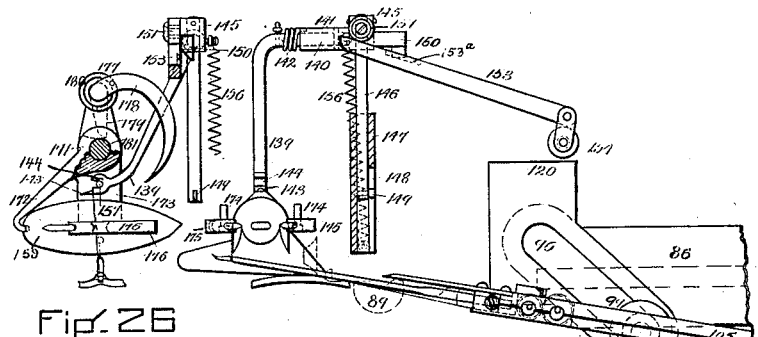
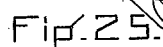
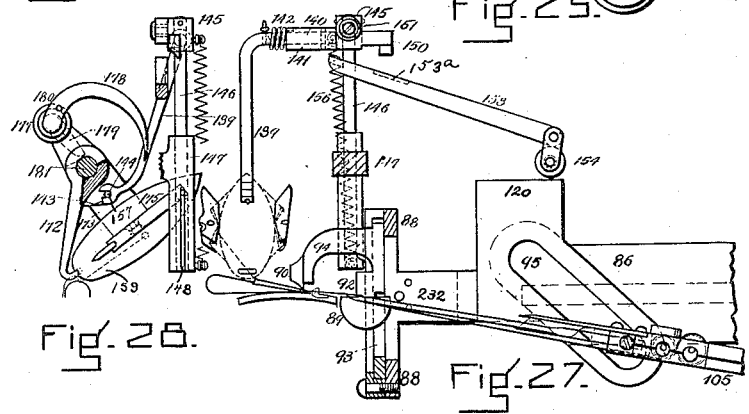
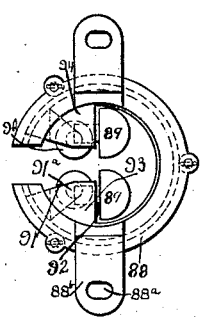
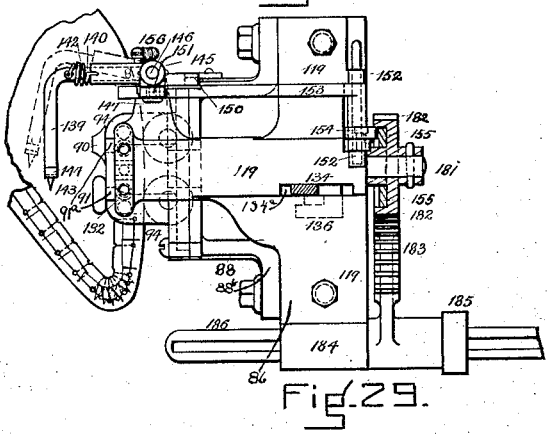
WITNESSES
Wm P Perry
Edward S. Day
INVENTOR
Jos. E. Crisp

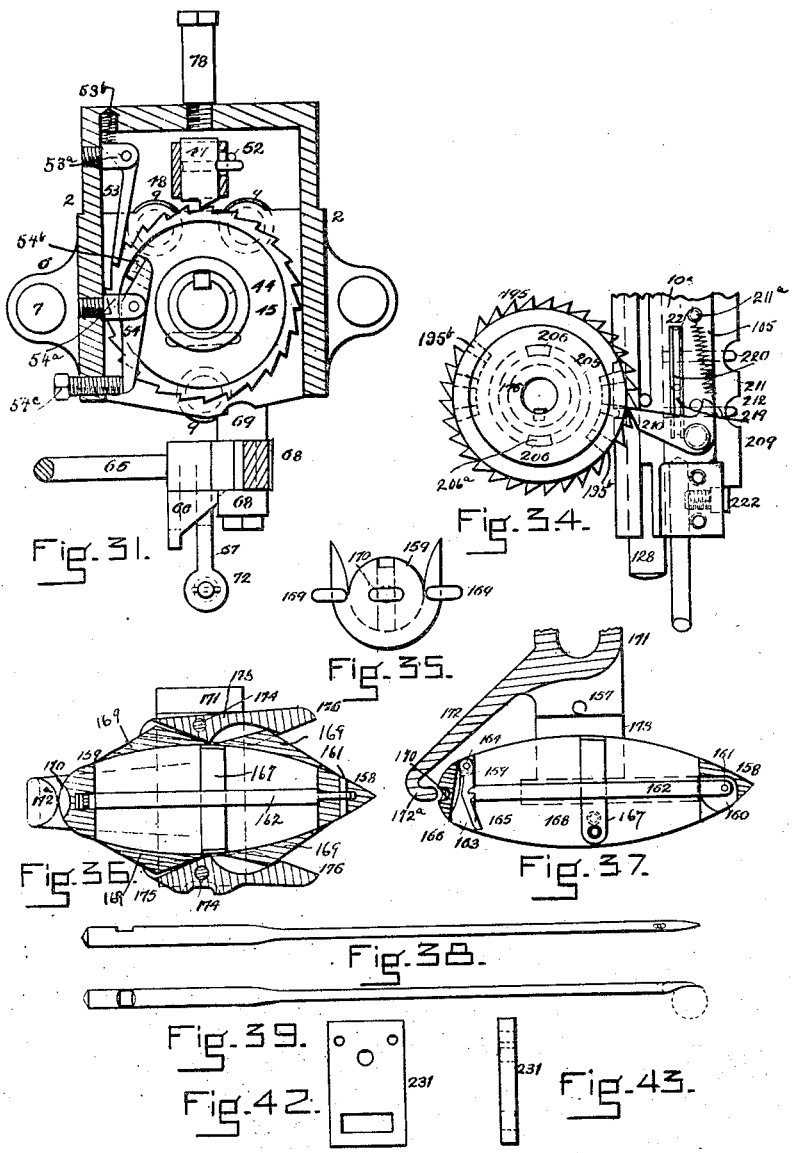

J. E. CRISP.
LASTING MACHINE.
APPLICATION FILED DEC. 6, 1894.
1,110,422.
Patented Sept. 15, 1914.
14 SHEETS—SHEET 12.
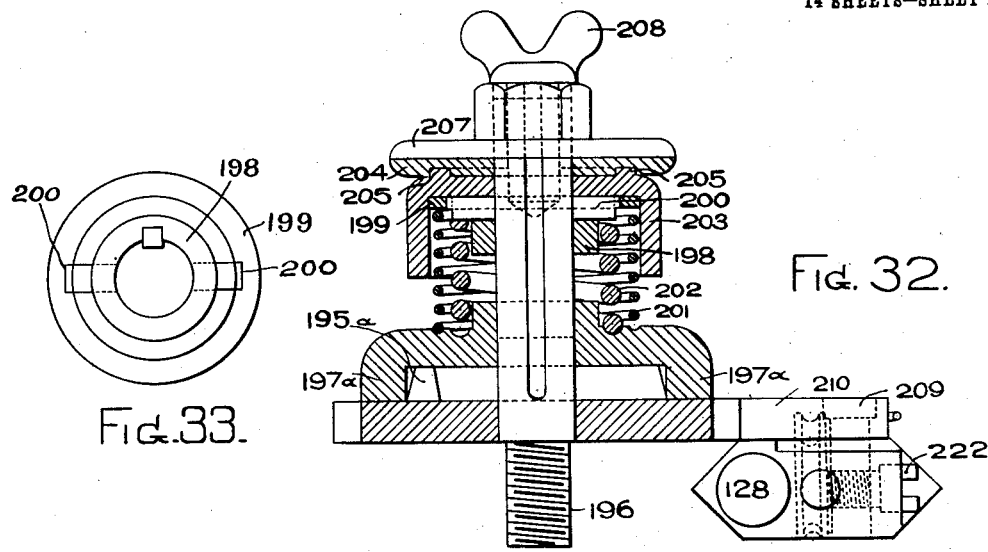
Fig. 32.
Fig. 33.
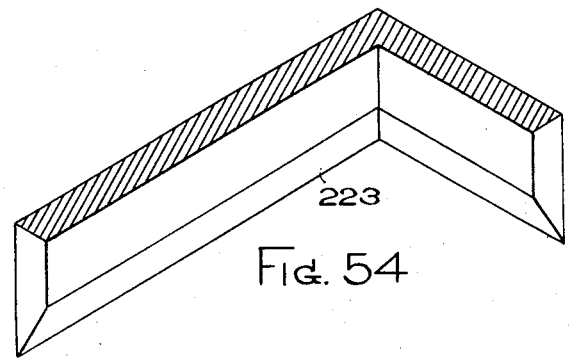
Fig. 54
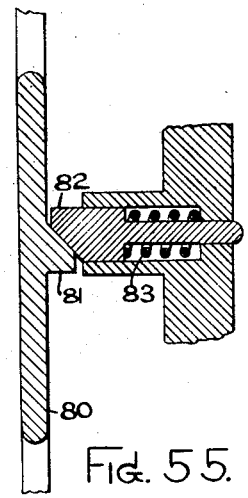
Fig. 56
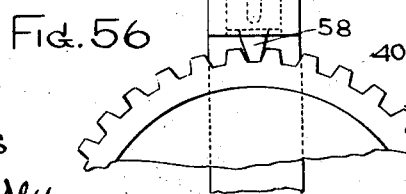
Fig. 55.
WITNESSES
Farnum F. Dorley
Alfred H. Hildreth
INVENTOR
Joseph E. Crisp,
by his Attorney
Benjamin Phillips

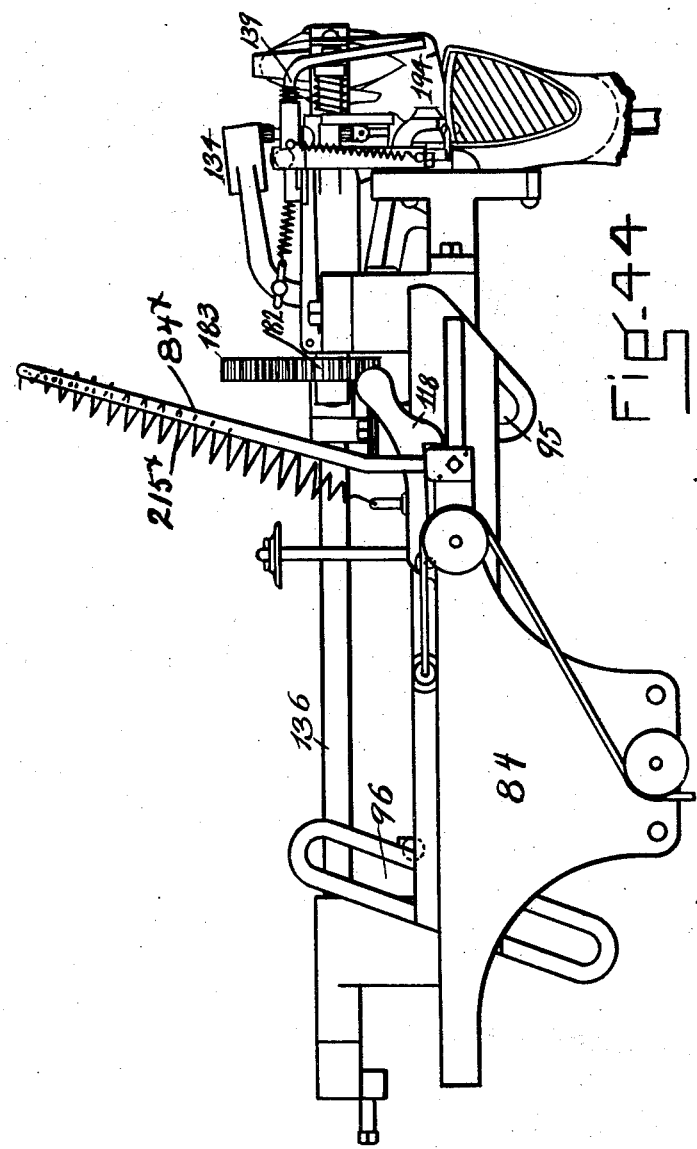

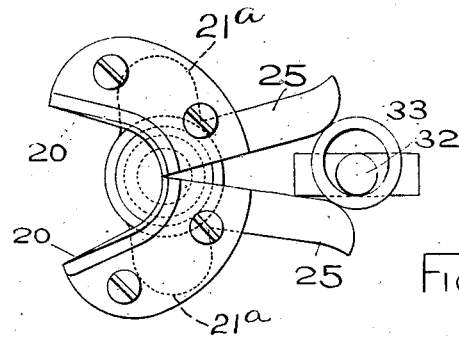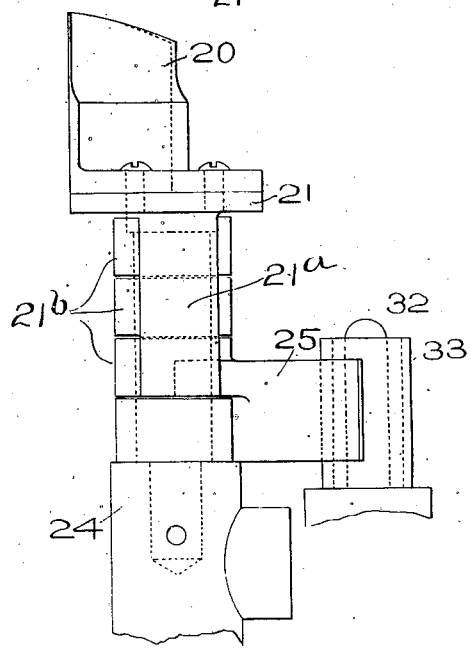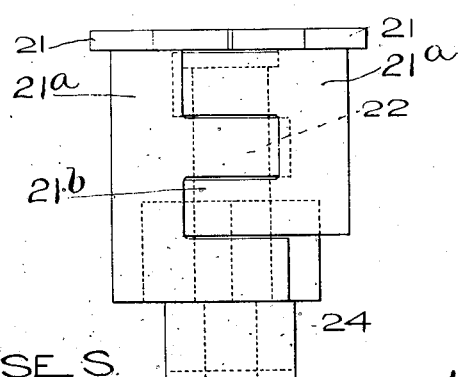

UNITED STATES PATENT OFFICE.

JOSEPH E. CRISP, OF SOMERVILLE, MASSACHUSETTS, ASSIGNOR TO UNITED SHOE MACHINERY COMPANY, OF PATERSON, NEW JERSEY, A CORPORATION OF NEW JERSEY.

LASTING-MACHINE.

1,110,422.  Specification of Letters Patent.  Patented Sept. 15, 1914.

Application filed December 6, 1894. Serial No. 531,031.

*To all whom it may concern:*

Be it known that I, JOSEPH E. CRISP, a citizen of the United States, residing in Somerville, in the county of Middlesex and State of Massachusetts, have invented a new and Improved Lasting-Machine, of which the following specification and accompanying drawings are such a full, clear, and exact description as will enable those skilled in the art to make and use the same.

The present invention relates to lasting machines, and more particularly to that type of lasting machines in which the upper is secured to the inner sole by stitching it thereto.

The object of the invention is to reorganize and improve lasting machines in the respects hereinafter pointed out, and to this end the invention consists in the devices and combinations of devices hereinafter described and claimed.

Heretofore in machine lasting of boots and shoes, the inner soles and uppers have been assembled upon the lasts and there secured in position with several tacks before they were presented to the machine, after which the uppers were drawn around the lasts and secured to the inner soles by a series of operations partly manual, and partly mechanical.

In the present machine, the uppers, lasts and innersoles are assembled in a jack which has means to clamp the upper at the ends of the last and conform it thereto and which holds the upper and last in position, with the edges of the upper substantially perpendicular to the face of the innersole, and the jack is then presented with the unlasted shoe thereon to mechanism which automatically cuts the margin of the upper serially into sections, and then draws the sections over upon the insole and secures them to the insole by stitches.

Figure 45:
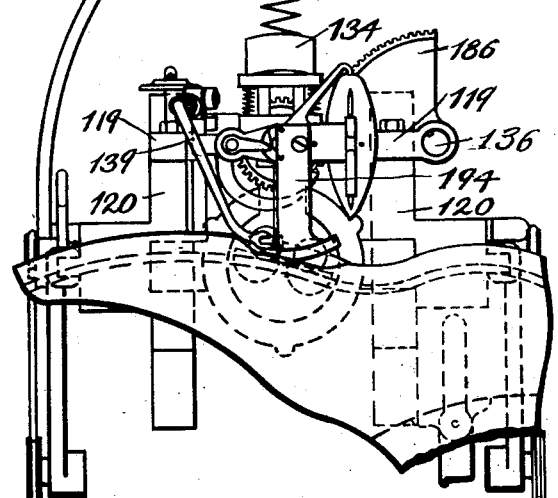
Figures 12, 13:
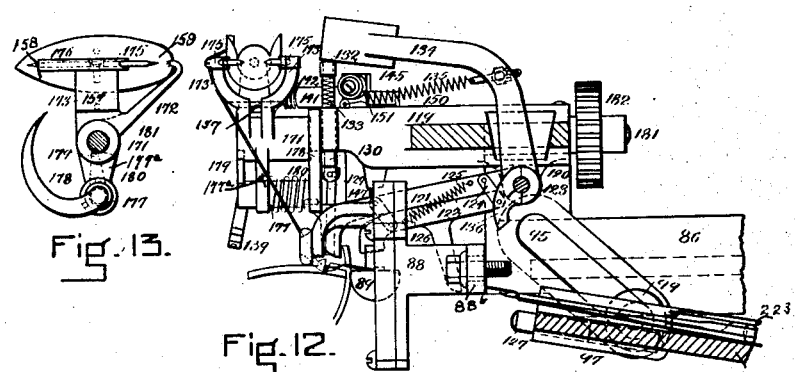
Figures 14, 15:
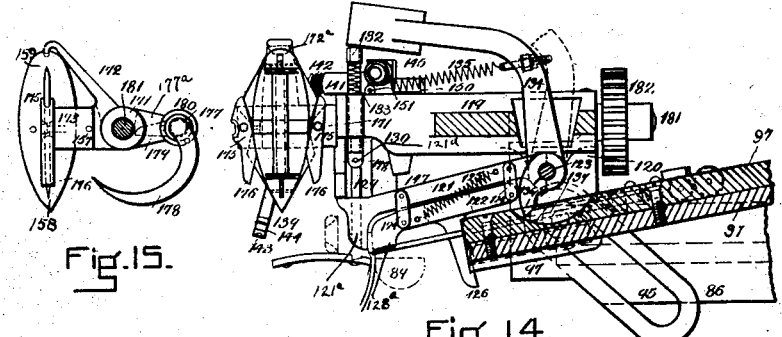
Figures 16, 17:
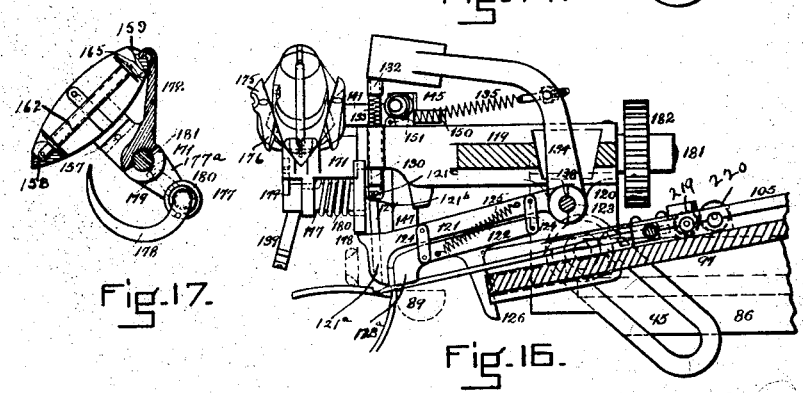

The preferred form of the present invention is shown in the accompanying drawings in which, Figure 1 formed of two parts 1ª and 1ᵇ is a side elevation of the machine, showing in section the last supported by the jack with the sewing needle half through the innersole, and also showing in section the mechanism for operating the machine by hand. Fig. 2 is a front elevation of the stand supporting the jack with the hand operating mechanism removed, showing portions of the jack feeding mechanism, and a front elevation and section of portions of the sewing mechanism. Fig. 3 is a horizontal cross section of the stand Fig. 2, on the dotted lines o—o Fig. 2 looking from the top, showing various details of the machine starting and stopping mechanism. Fig. 4 is a detached elevation showing the relations of shipper lever and clutch. Fig. 5 is a front elevation of the stand and stationary frame which supports the sewing mechanism, with the shuttle stand and guide mechanism removed, the swinging frame being at its backward inclination. Fig. 6 is a central vertical section of the stationary frame of the sewing machine and the parts mounted and operating thereon, with the shuttle stand and guide mechanism removed, showing the sliding frame forward and the swinging frame at its backward inclination. Figs. 7 and 8 are detached views showing the mechanism which reciprocates the needle bar. Fig. 9 is a plan view of the machine with the swinging frame at its backward inclination and a portion of its forward end and the shuttle stand and guide mechanism removed, showing the relation of the automatic stop mechanism to the base of the jack. Fig. 10 is a partial plan of the base of the jack and its supporting table, showing the means used to move the jack with reference to the sewing mechanism and the mechanism by which the swinging of the ends of the last is adjusted and accomplished. Fig. 11 is an enlarged vertical cross section of the jack, showing by dotted lines the relation of the last to the end clamping mechanism, the side guides, and innersole holding guides; also showing an end elevation of the shuttle stand and the mechanism supported by it. Fig. 12 shows the manner of mounting the indenting hammer and holding pincers on the shuttle stand, a side elevation of the stand supporting the side and holding guides, with said guides in position on the upper and innersole, and a section of the forward end of the swinging frame at its backward inclination with the needle and shuttle in position at the termination of a stitch. Fig. 13 is a plan of the shuttle carrier and its attachments in position with reference to Fig. 12. Fig. 14 is a similar view to Fig. 12, with the guide stand removed and the guides indicated by dotted lines, with a section of the swinging frame in its forward position showing the means used to raise the indenting hammer, the holding pincers closed upon the edges of the upper and guiding the point of the needle, and the shuttle carrier holding the pincers in position. Fig. 15 is a plan of the shuttle carrier and its attachments in position with reference to Fig. 14. Figs. 16 and 17 are views showing the position of the pincers, needle and shuttle and their operating mechanism at the time the point of the needle is being pressed into the indentation in the innersole. Fig. 18 is a central section of the shuttle stand, also showing a portion of the swinging frame at its backward inclination, and the point of the needle just passing through the edge of the upper. Fig. 19 is a section of the shuttle stand showing the manner of supporting and operating the looper; also showing the pincers closed upon the upper and holding the portion thereof just separated therefrom by the slitting and trimming knife. Fig. 20 is a section of the shuttle stand showing the looper just swung into contact with the needle thread; also showing a presser-foot which holds the free edge of the upper clear of the point of the needle, and the spring operated plunger which closes the pincers when the point of the needle passes through the upper. Fig. 21 is a cross section of the shuttle stand showing the manner of mounting and operating the indentor. Figs. 22 and 23 show a portion of the needle bar and its attachments and an end elevation thereof. Fig. 24 is a detached view showing the relation of looper and guard, Fig. 20, with reference to the shuttle. Figs. 25 and 26 show the position of looper, shuttle and their operating mechanism when the center of the shuttle is in the loop. Figs. 27 and 28 show the position of the looper, shuttle and their operating mechanism when the needle thread is separating from the shuttle; also a cross section of the guide roll stand. Fig. 29 is a plan of the shuttle stand with the indenting hammer removed, showing by full and dotted lines the two positions of the looper; the shuttle driving pinion in section and a portion of a last in position upon the guiding and holding devices. Fig. 30 is a front view of the guide and holding stand. Fig. 31 is an enlarged horizontal cross section of the stand on line $p$—$p$ Fig. 1$^b$ looking from below, showing portions of the feeding and shipper mechanism. Figs. 32, 33 and 34 are enlarged views showing the construction and operation of the automatic variable tension device. Figs. 35, 36 and 37 are enlarged views showing the construction, manner of mounting and operating the shuttle. Figs. 38 and 39 are enlarged elevations of the needle. Figs. 40 and 41 are enlarged end views showing the forms of cutting edges of the two styles of slitting and trimming knives. Figs. 42 and 43 are an enlarged plan and a side elevation of the welt guide. Fig. 44 is a side elevation of the upper part of the machine opposite to that shown in Fig. 1$^a$ showing various details of construction to be hereinafter referred to. Fig. 45 is a front elevation of the sewing mechanism shown in section in Fig. 2, showing the section of the guard which holds the free edge of the upper clear of the needle. Fig. 46 shows enlarged a portion of a lasted upper and the stitch. Figs. 47, 48, 49 and 50, show enlarged the indentation of the innersole and the loops formed on the face thereof. Figs. 51 and 52 show enlarged the hammer clutch mechanism. Fig. 53 shows enlarged a side elevation of the tension mechanism as shown in Fig. 6. Fig. 54 shows in perspective the cutting extremity of the form of knife shown in Fig. 40. Fig. 55 is a vertical sectional detail of the construction of the catch by which the hand actuated mechanism is rendered operative. Fig. 56 is a detail showing the flattened pin which engages the jack feeding gear when the jack is swung at the heel or toe. Fig. 57 is a plan view of one of the sets of clamps on the jack with a part of the actuating mechanism therefor. Fig. 58 is a side elevation of the same parts and Fig. 59 is an end view showing the manner in which the wings are mounted on the standards 23 and 24.

In the drawings 1 is the base of the machine from which project the standards 2 and 3 in which are suitable bearings 4 for the main shaft 5. Loosely mounted upon the main shaft 5 is a belt pulley A, located between the standards 2 and 3, said pulley being connected at times to said shaft by a suitable clutch mechanism under the control of the operator to actuate the machine as is usual in machines of this character. The jack is arranged to be moved vertically to bring the edge of the upper of a shoe on a last placed on said jack in position to be acted upon by the devices which pull over and secure the edge of the upper and is also caused to travel along beneath said devices to bring successive portions of the edge of the upper in position to be acted upon by said devices.

To secure the above result the standard 2 has upon its sides suitable guides 6 in which are fitted for a vertical sliding movement the guide rods 7 upon the upper ends of which is mounted a table 8. The table 8 is normally yieldingly sustained by suitable springs, such as the coiled springs 9, whereby the jacked last and shoe is presented in proper vertical position to be acted upon by the mechanism which pulls over and secures the edge of the upper. As shown in the drawings the springs are three in number and bear against the under side of the table 8 at their upper ends, their lower ends rest ing upon a cross-piece 46ˣ of the standard 2. The table 8 and the jack mounted thereon, may be depressed against the force of springs 9, when removing a lasted shoe and replacing it with an unlasted shoe, and to hold it in its depressed position I have provided a counterweighted latch 10 which is arranged to engage a notch 11 formed in one of the guide rods 7 as clearly shown in Fig. 2.

The jack is preferably constructed and arranged as shown in Figs. 1ᵃ, 2, 9, 10 and 11. 57, 58 and 59 and comprises a base plate 12 having a pair of upwardly projecting ribs 13, upon the upper edges of which is a plate 14, provided with ribs 15, the inner faces of which form a dovetail guideway 15* which extends along the longitudinal center of the plate 14 for nearly the length of said plate. Fitted to slide along this guide way 15* are suitable blocks 16, 17 and 18 upon which are carried the heel and toe clamps and the jack post and toe rest, as will be hereinafter described. The heel and toe clamps 19 and 20 are preferably thin blades or plates which approximately conform to the ends of the last at the toe and heel and are each provided with a flange at their lower parts by which they are removably secured in any suitable manner to the pivoted wings 21, and they are so fixed upon the wings 21 that their central point of contact is coincident with the center of motion of said wings. The clamps 19 and 20 are changed for variations of style of toe or heel, but not for variations of length of lasts of the same style. The wings 21 as shown in Figs. 57, 58 and 59 are provided with shanks 21ᵃ integral with collars 21ᵇ by which they are pivotally mounted on pivots 22 which are fixed in the standards 23 and 24 projected vertically from the slide blocks 16 and 18. Projecting from the bearings of the wings 21, are the arms 25, the inner sides of which are inclined from each other and having rounded ends, the arrangement being such that a suitable device may be forced between the arms 25 forcing them apart and causing the wings 21 to turn on the pivots 22 to close the clamps 19 and 20 upon the ends of the last firmly clamping the upper and conforming it to the ends of the last.

The mechanism for actuating the clamps, is of the following construction and arrangement: Fixed to the top of plate 14 are the stands 26 provided with suitable bearings in which are mounted to turn, but fixed from longitudinal movement therein, the right and left screws 27. The screws 27 are geared together as shown in Figs. 1 and 9 to turn in unison and are provided with means such as a square taper spindle, to be engaged and actuated by a crank. These screws 27 engage nuts 28 which are pivoted to the swinging levers 30, said nuts being provided with pins 29 which are received in correspondingly shaped holes in said swinging levers, which are pivoted at 31 to the slide blocks 16 and 18 so that a rotation of the screws will swing levers 30 in the blocks 16 and 18. The lower ends of the levers 30 are fitted in suitable bearings 30* in the blocks 16 and 18 the walls of said bearings acting as stops to limit the swinging motion of levers 30 in both directions, the result being that when said levers have reached the limit of their throw in either direction, a further rotation of the screws 27 will cause the blocks 16 and 18 to move along the guide way 15* toward or away from each other. Fixed to the upper ends of the levers 30 are the rounded pins or bearings 32 upon which are loosely mounted the rolls 33, the central holes in which are preferably larger than the bearings or pins 32 allowing considerable lost motion of the rolls 33 so that the rolls 33 may assume an eccentric position when the clamps are acting upon crooked lasts in order that said clamps may conform thereto. The above described mechanism is such that when the screws 27 are actuated to draw the levers 30 toward each other, the rolls 33 upon the upper ends of said levers engage between the arms 25 of the clamps 19 and 20 force the arms 25 apart, and close the clamps 19 and 20 around the ends of the last, the play of the rolls 33 upon their bearings allowing the clamps 19 and 20 to automatically adjust themselves to lasts which have considerable "swing" or lateral inclination of the toe, or to right and left lasts, as the case might be.

In order that the clamps 19 and 20 may remain open during the movement of the slide blocks 16 and 18 toward and away from the last and until they have reached the ends of the last, I have arranged suitable springs 34ˣ in seats or pockets 34* in the upper ends of the standards 23 and 24, the outer ends of said springs 34ˣ engaging the upper ends of the levers 30 tending normally to force said levers 30 away from the standards 23 and 24, the backward movement of the levers 30 being so limited by contact with the ends of the slots 30* that when forced back to their full extent, the clamps 19 and 20 may be opened to receive the largest last of the series they are designed to operate upon. When the blocks 16 and 18 have brought the clamps into contact with the ends of the last, a further rotation of the screws 27 will swing the levers 30 inward against the pressure of springs 34ˣ, causing the rolls 33 to engage the arms 25 and close the clamps around the last. The centers of the clamps are fixed with relation to the longitudinal center line of the base plate, and they always bring the centers of the toe and heel of the last coincident therewith, regardless of the longitudinal "swing" of the last. Upon a sliding block 17 placed between the blocks 16 and 18 is a stand 34 upon one end of which is arranged the toe rest 35 said toe rest being arranged to slide thereon for longitudinal adjustment, and upon the other end of said stand 34 is arranged the jack post and pin 36 which is adapted to swing laterally upon a pivot 36* for a transverse adjustment. The stand 34 has a base which is secured to the block 17; from the base the body of the stand rises vertically, carrying a forwardly projected bar which is embraced by the base of the toe rest 35 (see Figs. 11 and 9) upon which projection the toe rest may be slid to the proper position, and upon the rear side of the body of the stand the jack post and pin 36 is secured by means of the pivot 36* above referred to.

The slide blocks 16, 17 and 18 are all fitted to move freely along the guideway 15*, and to maintain the blocks in proper position relative to each other I have provided the springs 37 and 38 which are fitted in bearings 38* in the blocks 16, 17 and 18. The relative compressibility of the springs 37 and 38 is preferably such that as the clamps 19 and 20 are moved by the screws 27 toward the last upon the jack pin, the heel clamp will come into contact with the last first, causing the toe of the last to be forced down against the toe rest, whereby the upper will be first clamped upon the last at the heel and can then be pulled up and adjusted at the toe prior to the further movement of the clamps to cause the toe clamp to engage the upper on the last to hold the upper at the heel and toe in proper position without the use of tacks.

In the operation of assembling and jacking, the last is placed inside the upper and placed upon the jack pin, the screws 27 being turned until the center of the heel clamp 19 engages the center of the upper at the heel of the last which causes the toe of the last to be thrown down upon the toe rest. The innersole is now placed upon the last, or the outersole in the case of lasting "turns" and the counters and quarters of the upper correctly adjusted, whereupon the screws 27 are further turned causing the heel clamp 19 to be closed somewhat around the heel end of the last, and the center of the toe clamp 20 to contact with the center of the upper at the toe of the last. The toe of the upper is then properly adjusted and the screws 27 given a final turn which causes the heel and toe clamps 19 and 20 to firmly clamp the heel and toe of the upper against the last, the last becoming as it were an inner clamping member and the clamps 19 and 20 an outer clamping member to hold the upper and insole in position during the subsequent operation of the machine thereon. The jack post and toe rest are arranged so that the edges of the clamps 19 and 20 come nearly, if not quite, to the upper edge of the ends of the insole, whereby the clamps are caused to hold the upper with its free edge projected substantially perpendicular to the face of the sole in proper position to be acted upon by the lasting devices.

The range of lengths of lasts is considerable and there are large variations of styles of heels and toes and a long last will require more stitches to last the upper than a short one, and a large heel or toe more than a small one, and also the stitches should be spaced closer at the heel and toe than along the sides. In the machine of the drawing, I have provided a jack feeding mechanism which will automatically adapt itself to the requirements of the particular size and style of last and when once set correctly for a particular style of heel and toe, the act of jacking the last causes the automatic adjustment of the feed mechanism for such length of last, without any care on the part of the operator.

The above result is obtained by the feed mechanism which will now be described. To the inner sides of the ribs 13 of the base plate 12 are secured the racks 39, 39, the space between them being of such width relatively to the diameter of the pinion 40 that said pinion will not engage with either rack 39, when centrally between them as shown in Fig. 10. The pinion 40 is fixed to the upper end of a shaft 41, which is fitted to revolve in a bearing 42 formed in the jack supporting table 8, so that said shaft will rise and fall with said table. Shaft 41 is also fitted to revolve in and slide vertically in a bearing 43 formed at the top of the jack supporting standard 2, and to slide vertically in and revolve with the sleeve 44 which carries a ratchet wheel 45 and revolves in bearings 46 in the standard 2. The pinion 40 is given a step by step revolution by a pawl 47 carried by the upper end of a lever 48 each step representing one stitch of the sewing mechanism. The lower end of the lever 48 is formed into a cam 49 which the cam roll 50 of the crank 51 fixed on the main shaft 5, engages, and swings at the correct times. The spring 52 presses the pawl 47 toward the teeth of the ratchet wheel 45 and the retainer pawl 53 and the adjustable brake 54 insures the position of the pinion 40 when the sewing mechanism is operating, see Fig. 31. The pawl 47 is a block which slides in a bearing in the upper end of the lever 48 and is pressed toward the ratchet wheel 45 by the spring 52. The retaining pawl 53 is pivoted to a stud 53ᵃ secured to the side of standard 2 and has a portion acted upon by a spring 53ᵇ, whereby the end of said pawl is held to engage said ratchet 45. The brake 54 is pivoted to a stud 54ᵃ upon the side of standard 2, and carries at one end a brake shoe 54ᵇ arranged to engage the inner face of a flange formed upon the ratchet 45. The pressure of the brake shoe 54ᵇ may be adjusted to any desired degree by means of a screw 54ᶜ which is tapped into the wall of standard 2, the end of which engages the outer end of the brake lever 54. In the base plate 12 of the jack is formed a slot 55 through which projects the shaft 41 and thus the jack is enabled to move along past said shaft during its feeding movement. The slot 55 is wide enough to permit a lateral movement of the jack to permit either of the racks 39 to engage the pinion 40 but not wide enough to permit the teeth of the pinion and racks to bottom, so that when the jack is swinging to adjust itself to the lateral curvature of the bottom of the last along the sides thereof, it will swing upon a bearing formed by the contact of the sides of the slot 55 and the shaft 41, instead of upon a bearing formed by the tops of the teeth of the racks 39, contacting with the bottoms of the spaces between the teeth of the pinion 40, thus reducing the friction of swinging to a minimum.

In many types of boot and shoe machinery such as pegging machines and sole cutting machines, the jacks were designed to be fed along by racks and pinions, but the racks in such machines were provided with curved ends or toothed segments at the ends, whereby the jack was turned as the work progressed around the toe or heel of the shoe. In such constructions the turning at the ends always required the same number of movements of the feed mechanism and if the length of feed were adjustable, such adjustment could only be obtained by a tooth by tooth adjustment. It is recognized that the thickness of material in a shoe at the ends of a last will, and does vary, more than one-sixth of an inch as an extreme, with all possible minor graduations below such extreme variation. These variations cannot be correctly provided for in the feed by a rack and pinion of any pitch, where the adjustment is one of tooth by tooth. In the present construction, the automatic adjustment for length of last is not governed by the pitch of the rack teeth, nor the time of turning at the heel or toe by the pitch diameter of the driving pinion. In the present machine when the heel or toe of the last arrives at the point where it is desired to turn the same, the action of the side guides assists in disconnecting the pinion from the rack with which it may at that time be engaged, and the jack is locked or held fixed with reference to the center of the pinion where it is held until the turn is made, and thereafter the opposite rack engages with the pinion to again feed the shoe to bring the opposite side under the action of the machine.

The mechanism for swinging the jack as the toe or heel of the last is reached is as follows: Fitted in dovetail bearings in the under sides of blocks 16 and 18 (see Fig. 11) are slides 56, in which are formed suitable bearings 57, in which are mounted the pins 58, which are pressed outwardly or in a direction to engage with the pinion 40 by the springs 59. The outer ends of these spring pins 58 are flattened to enter the spaces between the teeth of the pinion 40 and said pins are arranged to project from the bearings more than the length of a tooth of said pinion. The inner ends of the slides 56 are formed into thin flat bars or arms and project far enough in advance of the face of the bearings 57 to allow the notch 60 in their ends to engage a pin 61 fixed upon and extending from the end of shaft 41 and concentric with the axis of said shaft, when the flattened end of one pin 58 is engaged with the teeth of the pinion 40, (see Fig. 10) and when the notch 60 engages the pin 61, the jack is locked to the pinion, and said pinion is then disengaged from the rack with which it has been meshing, and the jack instead of having a longitudinal movement imparted to it by the pinion and rack, partakes of the rotary movement of said pinion moving the end of the jack in a curved line with the shaft 41 as a center, and the surface speed of the end of the last past the lasting devices depends upon the distance of the heel or toe from this center. The adjustment for style of heel or toe can be made by moving the slides 56 longitudinally in the blocks 16 and 18 and securing them in the desired position by the set screws 62 see Fig. 11. If the end of the toe of the last, when the jack and pinion are locked together, is located in line with the pitch line of the pinion 40, its speed past the devices which secure the edge of the upper will be the same as that which the sides of the last have been moved, and the stitches at the ends of the lasted upper would be too far apart if the toe of the shoe be a small one. If the end of the toe of the last when the jack and pinion are locked together, be located directly in line with the pin 61, it would require more than half a turn of the pinion 40 to move the toe of a pointed last half around so as to bring the side guides of the machine on the opposite side of the shoe. As the pitch diameter of the pinion 40 is considerably larger than the largest heel ever made, the stitching in this position would be too fine to be practical but at some point between these two extremes the desired length of stitch for round ended toes can be found. For square corner toes the point of adjustment would be beyond the center of pin 58, which will cause the sides and ends to move faster than the corners of the lasts. As the side guides meet the round end of the toe or heel and the last turns against said guides, to meet the inclination one of the pins 58 either strikes upon the point of a tooth of the pinion 40, or enters a space between two teeth of said pinion. If it strikes the point of a tooth the spring 59 yields, until a space is presented, when said pin 58 enters said space and locks the pinion and jack together as before described, and a further movement of the pinion and jack combined with the pressure of the side guides acts to disengage the pinion from the rack with which it was in mesh and the notch 60 engages with the pin 61, when the end of the last moves around as described. When the pressure of the side guides is brought to bear upon the opposite side of the end of the last, by reverse movements the pinion engages with the other rack and the last moves endwise to again bring each portion of the upper along the sides in position to be acted upon. During the entire movement of the jack the side guides press against the upper on the last or on the clamps 19 and 20 at the heel and toe and keep the pinion 40 engaged with one of the side racks 39 or with one of the end turning devices, and these side guides also act to position the curved sides of the last with relation to the slitting and sewing devices.

By the above described combination of mechanism four independent devices, the side racks and end turning devices are in turn connected to the power operated mechanism, to feed and turn the jack and each side and end of the jack is operated by its special device without reference to the others, while such operation is taking place.

To enable the side guides to perform their functions without injury to the upper, the base of the jack and its supporting table have been specially constructed, the supporting table 8 being of considerable size, and ribbed or braced for the purpose of rigidity and strength. The labor and strain of jacking is brought as much as possible upon the screws 27, and inspection of the drawings will show that the base of the jack when the top plate 14 is in position, forms a hollow girder which is light and at the same time so rigid that flexure under such strain as may be brought upon it during the lasting operation is almost impossible.

In order to provide for a free movement of the jack, the bottom face of the base plate 12 and the top face of the table 8 are fitted to each other as are the contacting surfaces of surface plates, of which it is well known that one of a very heavy pair of plates can be moved upon the other with a slight exertion of power, or if desired any suitable ball bearing construction may be employed between the two plates. In any event however the jack is designed to "float" upon the plate or table 8—that is, to be capable of movement thereon in any direction in a horizontal plane—and any suitable lubricant may be employed between the jack plate 12 and the table 8 to assist the easy movement of the jack, so that said jack may be moved readily by the feed mechanism and controlled by the side guiding devices, as hereinbefore described. The belt pulley A is connected to and disconnected from the main shaft 5, manually or automatically as required by a train of mechanism comprising the short shaft 63 mounted to turn in the ears 64 on the jack supporting table 8. To one end of shaft 63 is fixed the shipper lever 65 and to its opposite end the bell crank lever 66 and 67, the lower arm 66 of which is inclined or provided with a cam face 66ª arranged to engage the double ended lever 68 and move the same from the position of the dotted lines Fig. 4 to the position of the full lines Fig. 4, when the shipper lever 65 is moved to the position Fig. 1, or fully depressed. In this position, the beveled upper end of the double-ended lever 68 is parallel with the guide rods 7 and the jack supporting table 8 which carries the bell crank lever 66, 67, can be raised and lowered without effecting the relations of the lever 68 and the clutch. The lower end of lever 68 is inclined as shown at 68ª and when in position to engage the incline on the movable clutch member, said clutch member is moved and unlocked from a complementary clutch member on the driving pulley, thus stopping the shaft 5, and the inclines upon the lever 68 and the clutch are so fitted or formed relatively to each other that when the incline 66ª is moved away from the lever 68, the action of the springs 70 moves said clutch member toward the pulley A or into engagement with a complementary clutch member connected with the pulley A, moving lever 68 to a position to cause the incline 68ª to release the incline 71 on the clutch, and set the machine in motion. The shipper lever 65 is made to overbalance the bell crank lever 66 and 67 and hold the incline 66ª in contact with the double ended lever 68. To hold these parts separated when it is desired that the machine shall act, there is mounted in the end of the horizontal arm 67 of the bell crank lever 66 and 67, a pin 72 actuated by a spring 73, said spring being strong enough to hold the outer end of the shipper lever 65 elevated when the rounded end of said pin 72 is brought into contact with the under surface of the base plate 12 of the jack. The length of the horizontal arm 67 is such that the pin 72 will always contact with the under surface of the base plate 12 and when in this position the machine is in motion. At the point where it is desired that the machine shall stop, a notch 74 is cut into the base plate 12, this notch being of such a length as to represent three or four stitches of the stitch forming mechanism of the lasting devices, one end of the notch being beveled off at 74 as shown in dotted lines Fig. 9. When the action of the feed mechanism brings the notch 74 over the pin 72, the weight of the shipper lever 65 swings the incline 66ᵃ into contact with the upper end of the double ended lever 68, and releases the clutch and the machine stops. If it is desired to stop the operation of the machine at any other point, depressing the shipper lever 65 compresses the spring 73 and causes the lever 66 and 67 to act, and through the lever 68 release the clutch as before described. Releasing the shipper lever 65 allows the spring 73 to raise it and thus again start the machine.

At the commencement of the operation of securing the upper in the machine of the drawing, two or three stitches are formed in the work preferably by actuating the machine by hand, to insure the correct position of the upper on the insole. The mechanism for actuating the machine by hand may conveniently be of the following form and arrangement: A gear 75 mounted upon a suitable stud 76, meshes with an intermediate gear 77 mounted upon a stud 78, the studs 76 and 78 being mounted upon the standards 2. Upon the end of shaft 5 is mounted a gear 79 which is arranged to turn thereon and is locked to said shaft when desired by means of a disk 80, which is fixedly secured to said shaft 5, and has upon its inner face a catch 81, arranged to be engaged by a catch 82 pressed forward by a spring 83 in the path of movement of the catch 81. The backs of the catches 81 and 82 are inclined, and when the machine is operated by the power mechanism the inclines on meeting cause the spring catch 82 to be forced back against the tension of spring 83, thus permitting the train of gearing to remain at rest. When actuating the machine by hand, the gear 75 is turned by means of the handle 75ᵃ in the direction of motion of the belt pulley A and through the intermediate gear 77 causes the gear 79 to turn in the same direction and when thus turned, the square sides of the catches 81 and 82 will engage, thus turning the disk 80 and the shaft 5 actuating the machine. If desired, this train of gearing may be omitted or the machine may be provided with a hand wheel on the end of the main shaft.

Heretofore in the manufacture of boots and shoes the uppers have generally been secured to the innersoles during the lasting process, either by tacks driven through the uppers and clenched into the innersoles, or by sewing the upper to the innersoles by a process in which the stitches pass directly through the face of the innersole, or by sewing into a channel cut in the innersole or into a recess cut around the edge of the innersole. Each of the above methods of securing the upper and innersole together, have some objectionable features, which either impairs the quality of the finished shoes, or presents obstacles which increase the difficulty of using automatic sewing mechanism to draw the upper close to the innersole and there secure it.

Fastening the upper to the innersole by tacks is objectionable, because the tacks have to be clenched upon an iron bottomed last, so that they will not injure the foot of the wearer, and the inner surface of the innersole has to be lined to prevent the tacks from injuring the stocking. Sewing through the innersole also necessitates the use of a sock lining, and sewing into a channel or a recess in the innersole as above described requires an absolute correct adjustment of the innersole to the sewing mechanism, which adjustment requires much time and care on the part of the operator.

In the present machine the operation of lasting or the stretching of the upper and its fitting to the last and the securing of the upper and sole together is accomplished by the mechanism which will now be described and which comprises stitch forming devices which act upon the edge of the upper as it is moved along the same, and which stretches the upper and secures the same to the sole by stitches, the edge of the upper being acted upon in sections first upon one side and then upon the other.

To remove the difficulties of the methods of lasting hereinbefore referred to, the present machine preferably comprises an indentor which forms an indentation in the upper face of the insole upon the last, at the termination of each movement of the feeding mechanism which moves the jacked last, with the upper and insole assembled thereon past the sewing mechanism, the indentation being made in the surface of the insole at precisely the same place thereon each time, with reference to the edge of the innersole. After the indentation is made, the point of the needle of the stitch forming mechanism is pressed into this indentation with the shank of the needle inclined upwardly. While held in this position the needle is moved forward until it engages with and fairly enters the innersole at the bottom of the indentation, when the needle (while continuing to move forward) is moved to such a position that the shank will be downwardly inclined so that its point will penetrate the surface of the innersole and emerge from the upper surface of the innersole. This action of the needle raises a loop of the material of the innersole on its upper surface, through which the needle thread is passed, and by the aid of this loop, the needle thread draws the edge of the upper close to the surface of the innersole leaving the inner surface of the innersole smooth and without undesirable projections, as in the methods hereinbefore described.

The needle penetrates the margin of the upper from the outside the same distance from the face of the innersole, the point being pressed into the indentation in the insole as described, carrying down with it the edge of the upper, the further movement of the needle as described raising the loop of leather upon the face of the insole. The needle should be elastic enough to allow its point to be pressed and held close to the innersole and when fully advanced, it must be stiff enough to remain straight against the pressure of the springs which present the jack to the side guides.

The sewing mechanism and other lasting devices are mounted upon a frame 84 which projects from the standard 3. Mounted to slide in suitable guide ways 85 of the frame 84 is a frame 86 which has a motion in the frame 84 toward and from the jack and the last and upper thereon.

In the illustrated embodiment of the present invention, the frame 86 is forced toward the jack and work by the weights 87 which are mounted upon the ends of flexible cords or chains 87ª connected at one end at 87ᵇ to the frame 86 and passing over suitable guide rolls 87ᶜ. To the forward end of frame 86 is adjustably secured by means of screws, which pass through elongated holes 88ª in the arms 88ᵇ (see Fig. 30) the stand 88 which carries the side guide rolls 89 and the inner sole guiding and holding rolls 90 and 91 see Figs. 11 and 30. The stand 88 as shown, comprises a circular race or track open at the top, within which is fitted a circular ring or disk 93 free to turn in the stand 88, and upon this ring or disk 93 are mounted the side guides 89 and the insole guides 90 and 91 as clearly shown, the arrangement being such that the disk or ring 93 is free to turn as the insole guides conform themselves to the varying curves of the insole.

The side guides 89 are substantially hemispherical in shape and are mounted to revolve some distance apart upon projections 92 mounted upon the disk or ring 93. The insole guiding and holding rolls 90 and 91 are mounted to revolve upon studs 91ª carried upon the dependent arms 94 formed upon the ring 93. The roll 90 is made with a sharp edge which causes it to hold the innersole against the thrust of the needle, or said edge may be serrated if desired. The roll 91 is made with a rounded periphery which will allow it to swing upon the innersoles with reference to the holding roll 90. When the jack is forced upwardly by the springs 9 as described the innersole on the last is brought into contact with the rolls 90 and 91 which swing the ring 93, so that the rolls 89 conform their positions to the arc of the curve against which the rolls 90 and 91 press (see Fig. 11 where the dotted lines represent the edge of the last and innersoles and the rolls 90 and 91 are supposed to be resting upon the face of the innersole, not shown). The shape of the side guide rolls 89 enables them to press against the upper on the last at the shank, as well as the forepart and thus at all points of the feeding of the jack maintain the proper relations of the upper and insole, as do the heel and toe clamps at the ends of the last.

Several stands 88 may be provided each having holding and guiding rolls, at different distances apart, which may be employed alternatively to cause the stitching upon toes of different widths to be at the same distance from the edge of the innersole, or the thickness of the centers of the heel and toe clamps against which the guides act at the ends of the last may be varied to give the same result. The side guides 89 hold the sliding frame 86 at the same distance from the edge of the last fixed in the jack no matter what its curvature.

The needle bar is mounted in a frame 97 which has a swinging motion in the frame 86, the frame 97 being controlled in its movements by rolls 99 fixed upon studs in the sides of frame 97, which are guided by the guide slots 95 and 96 formed upon the inner sides of the frame 86. Inspection of Figs. 1ª and 6 will show that if the rolls 99 are moved from one extreme of the slots 95 and 96 to the other, the swinging frame will move to and from the jack and assume opposite angular inclined positions with reference to the line of motion of the jack.

The swinging frame 97 is operated by the following mechanism: A shaft 100 mounted in suitable bearings in the frame 84 is actuated from the main shaft 5 by means of the bevel gear 100ª on said shaft 100, and bevel gear 100ᵇ on the main shaft 5. Fixedly secured to the shaft 100 is a cam 114 which actuates the swinging frame 97 by connections as follows: Fixed to the swinging frame 97 is a bracket 101 which has at one end a bearing 102 in which is mounted the crank shaft 103, having a crank 104 which reciprocates the needle bar 105 with reference to the swinging frame. Formed upon the sides of the bearing 102 are the projected bosses 106 which at their outer ends carry rolls 107. Fitted to slide vertically in dovetail guide ways 108ª on the inner sides of the frame 84 are the slides 108 carrying at their upper ends the guides 109 engaged by the rolls 107. To the slides 108 are pivotally connected at 108$^b$ the connecting links 110, which at their lower ends are pivotally connected at 108$^c$ to the swinging forked lever 111 which is fulcrumed at 112 to the frame 84. The swinging lever 111 carries a cam roll 113 which engages the cam groove in the cam 114 fixed on the cam shaft 100. The arrangement just described is such that a rotation of the shaft 100 will by means of the cam 114, lever 111, link 110 and slides 108 cause an upward and forward motion of the swinging frame 97, such motion being controlled by the slots 95 and 96 and the rolls 99 on said frame. When the cam 114 is revolved, the rolls 99 are moved from end to end of their respective slots and the swinging frame rising and lowering assumes forward and backward inclinations at the ends of the slots. The crank 104 which actuates the needle bar 105 is connected therewith by means of the grooved slide 115 see Figs. 7 and 8, in the groove of which the slide block 116 mounted upon the crank pin slides. The crank shaft 103 is connected to the cam shaft 100 by a suitable extensible connection 117 having ball and pin connections at its ends, which cause the two shafts to turn in unison. These connections allow the swinging frame 97 free motion, and also permits the sliding frame 86 to be moved back from the jack when the machine is at rest and locked by the latch 118, see Figs. 5 and 6, which is hung upon the frame and drops down over the end of one of the slides. In Fig. 16 the swinging frame 97 is shown at its extreme forward position and inclination at the time the point of the needle has penetrated the upper and been forced into the indentation made for its reception in the face of the innersole.

In Fig. 18 the swinging frame 97 is shown at its extreme backward position and inclination when the point of the needle has penetrated the surface of the innersole. During the time of these movements the crank and cam shafts revolve, and as the motion of the crank moves forward the point of the needle with reference to the swinging frame, the action of cam 114 lowers said frame and its attachments and moves it backward. The effect of the movements of the swinging frame 97 upon the needle is to move said needle in a curved path the radius being that of the curve of the tip of the needle. The swinging frame 97 is held at its extreme backward limit until the stitch is set, when the action of the cam 114 again inclines it forward and then operates it as before.

The machine of the drawing has pincers or grippers to grip and hold the projecting edge of the upper, and an indentor as before stated, to indent the innersole, and these together with the looper and shuttle of the stitch forming devices are mounted upon a stand 119 which is fixed to the projections 120 formed upon or attached to, the horizontally sliding frame 86 as shown in Figs. 2, 20 and 29. The pincers 121 and 122 are hung upon the stand 119 at 123 so that they can be swung toward and from the last and a spring (not shown) acts to draw them away from the last. These pincers are not intended to draw the upper around the last, as in the usual lasting machines, but are designed to hold the edge of the upper in position for the point of the needle to penetrate it, to guide and hold the needle in the indentations made in the innersole, to assist in guiding the welt if desired, and to hold the edge of the upper when it is cut into sections and trimmed. The pincers consist of two jaws 121 and 122 which have a relative parallel movement to grip the leather, they being connected by the swinging links 124, two links on each side, and a spring 125 acts to hold the jaws separated.

Fixed to the movable jaw 122, there is the projecting arm 126 upon which a suitable spring actuated plunger 127 acts to close the jaws at the desired times. The plunger 127 is mounted to project from a recess 127$^a$ in the forward end of the swinging frame 97, see Fig. 20, and is acted upon by a spring 127$^b$ and partakes of the forward and backward movement of said frame 97, and in the forward movement of said frame, the end of the plunger 127 engages and exerts pressure upon the projection 126 to close the pincers upon the edge of the upper when the needle is penetrating the same, see Fig. 14. A similar plunger 128, see Figs. 22 and 23 acts to close the pincers when the slitting and trimming knife is operating, as in Fig. 19, and is mounted in and operates at the forward end of the needle bar 105 and is mounted substantially the same as the plunger 127, it being brought into contact with the projection 126 upon the forward movement of the needle bar 105. The forward end of the inner jaw of the pincers is grooved as shown at 128$^a$, Fig. 14, to receive and guide the needle when it is penetrating the upper and innersole, and the ends of the pincers are pressed yieldingly toward the last at the desired times by a cam 178 mounted upon the shuttle carrier which will be described with the shuttle carrier mechanism hereinafter.

The indentor 129, see Figs. 12, 14, 16 and 21, is formed with a beveled end with rounded corners which will not cut the thread should it happen to strike the same. The function of this indentor, as before stated, is to indent the innersole at the point it is desired the needle shall enter and form the loop upon the surface of the innersole. The indentor is arranged to reciprocate in a guideway 121$^a$ formed in the outer end of the pincer jaw 121 and its upper end is slotted at 121ᵇ so that it will not interfere with the motions of the pincers. The indentor is connected at its upper end by means of a pin 121ᶜ between the ears 121ᵈ formed upon a short cross bar 130 fitted upon the lower ends of two guiderods 131 which are connected at their upper ends to a longer cross bar 132, see Figs. 11 and 21.

The guide rods 131 are fitted to slide in the outer end of a stand 119 and springs 133 act against the longer cross bar 132 and normally maintain the indentor 129 in an elevated position.

The indentor is operated by the spring actuated hammer 134 which is mounted to swing on the same pin 123 that the pincers are, and its arm passes out through a slot 134ᵃ, Fig. 29, in the stand 119. The hammer is brought into contact with the cross bar 132 to actuate the indentor 129 and drive the same into the insole by means of the spring 135 one end of which is attached to the hammer arm and the other end to the stand 119. The spring 135 is preferably made adjustable by any suitable means in order to regulate the blow of the hammer upon the indentor to regulate the depth of the indentation made in the insole. The spring 135 is made strong enough to drive the indentor into the "tempered" insole, and it is arranged to normally hold the hammer when at rest as shown in Fig. 12.

The hammer is raised to the position of the dotted lines (see Fig. 14), by the face of the swinging frame 97 which engages the dog 136 as said frame moves forward and upward, and raises the hammer, until the cut away portion 137 in the frame 97, comes under the dog 136, when the spring 135 acts to pull down the hammer 134 to act upon the cross bar 132 to drive down the indentor and make the indentation in the insole. The hub of the hammer arm has the diametrical raised step 138, (see Fig. 16) and the dog is made with a step having a cutaway portion shown by the dotted lines of Fig. 14, and Figs. 51 and 52, these steps forming a clutch which engage with each other when the dog is moved in one direction but permits the dog 136 to swing as the swinging frame 97 moves to its backward position without affecting the position of the hammer and thus the hammer will only be actuated upon the forward movement of the swinging frame 97.

The looper 139 is arranged to engage the needle thread and forms and holds the loop open until the center of the shuttle has passed through it. The looper 139 is made integrally with the arm 140 which is fitted to turn a limited distance in the hub 141. Surrounding the arm 140 is a tortional spiral spring 142, one end of which is connected to the arm 140 and the other end to the hub 141 said spring acting to hold the point 143 of the looper so that when it is swung from the position of the full lines of Fig. 29, the hook 144 of the looper will be brought central with the line drawn from the center of the needle to the center of the shuttle shaft. The hub 141 is connected to or formed integrally with another hub 145 at right angles thereto which is fixed to a rod 146, (see Fig. 25) which is fitted to slide and turn in a bearing 147 on the shuttle stand 119 (see Figs. 11 and 29).

In the bearing 147 there is cut a narrow slot 148 (see Figs. 25 and 28) in which a pin 149 fixed to the rod 146 is fitted to slide. The rod 146 is long enough to allow the pin 149 to pass out clear of the lower end of the bearing 147 when the hub 145 is depressed and comes in close contact with the upper end of said bearing, (see Fig. 18). When in this position the rod 146 can be turned in the bearing 147.

Opposite the hub 141 there is formed upon the hub 145 a projection the outer end of which 150 is inclined or beveled off lengthwise the rod 146. Mounted to turn on a pin fixed in the side of the hub 145 is a roll 151. Pivoted upon the shuttle stand 119 at 152, (Figs. 19 and 29) so that it will swing parallel with the rod 146 and engage the roll 151 is a swinging bell crank lever 153, the short arm of which has a roll 154, which is acted upon by a cam 155 fixed in the pinion gear 182 which moves the shuttle shaft, said cam acting to swing the long arm of the lever 153 upward to raise the rod 146 and its attachments to the position shown in Figs. 25 and 27. The pull spring 156 attached to the hub 145 and the bearing 147 acts to draw the hub 141 toward the bearing, and to rotate the looper slightly in the bearing 147 but when the lever 153 is in the position of Fig. 19, the inclined end of the projection 150 will engage an incline 153ᵃ on the lever 153 and hold the point of the looper in the position shown by the dotted lines of Fig. 29, preventing further rotation thereof with the roll 151 at some distance from the lever 153. After the needle has reached its lowest point (see Fig. 19), and commenced to move back, by the time it has reached the position of Fig. 20 the movement of the cam 155 has swung the edge of the lever 153 into contact with the roll 151, and caused the incline 153ᵃ to act upon the incline 150, and turn the rod 146 in the bearing 147 and swing the point of the looper 139 from the position of Fig. 19 and the dotted lines of Fig. 29, to the position shown in Figs. 20 and 24, and the full lines of Fig. 29. By this movement the point of the looper 139 passes close to the side of the needle and engages the thread which has just commenced to slacken and the pin 149 is brought opposite the slot 148, so that the rod 146 can move upwardly in the bearing 147. As the needle moves back, the cam 155 continues to swing the lever 153 and the action of said lever upon the roll 151 draws the looper in advance of the shuttle and carries the loop of thread with it, back to the position shown in Figs. 25 and 26, where the action of the cam ceases and the hook 144 of the looper 139 engages with the fixed pin 157 of the shuttle carrying arms 173. At this point the center of the shuttle has passed through the loop of thread held open by the looper and as the shuttle swings to the position of Figs. 27 and 28 the pin 157 lifts the looper up and swings it back against the tension of the spring 142 and above the lever 153. This disengages the looper 139 from the needle thread and as the needle moves back it clears the thread from the back end of the shuttle, and when the shuttle moves back, the spring 156 returns the looper mechanism to its normal position.

The shuttle, (see Figs. 35, 36, 37) consists of a hollow metal body portion having front and back ends 158 and 159 of preferably hardened metal firmly fixed thereto. The front end 158 is pointed and in a slot 160 there is hung upon a pivot pin 161, the swinging spindle 162 which carries the bobbin. In the rear end 159 in a slot 163, is pivoted upon the pin 164 the swinging latch 165 which engages the end of the spindle 162 and locks the same in the position shown in Figs. 36 and 37, thus retaining the bobbin thereon. The latch 165 is acted upon by a spring 166 whereby its end is normally pressed toward the end of the spindle 162.

Any suitable tension device may be placed within the shuttle such as the spring device 167, which operates to hold the shuttle thread back as it passes from the bobbin out of the shuttle through the hole 168. On the outside of the shell of the shuttle are fixed the round edged wings 169 and at its rear end 159 is a recess or groove 170. The shuttle carrier 171 has a projecting arm 172, the outer end of which is inturned as shown at 172$^a$ and arranged to engage the groove 170 in the end of the shuttle, and when the end 172$^a$ engages said groove 170 the arm 172 supports the rear end 159 of the shuttle and receives the thrust of the shuttle as it passes through the loop of needle thread. The shuttle carrier 171 has forked arms 173 to which are pivoted at 174, (see Figs. 12, 25 and 36) the wings 175 each of which has a round bottomed groove, in which fit the round edged wings 169 by means of which the shuttle is supported and held in the desired operative position. The swinging wings 175 have extensions 176 which engage with the loop of needle thread as the point of the shuttle enters it. At such time the shuttle is supported by the arm 172 and by that portion of the grooves in the wings 175 which is at the forward ends 176 of said grooves (see Figs. 14 and 16). As the shuttle moves through the loop of needle thread, the thread engaging the forward ends of the wings 175 swings them away from the sides of the shuttle and when the shuttle reaches the position shown in Figs. 25 and 26, it is supported by the back ends of the wings 175 and the arm 172. Upon the further advancement of the shuttle through the loop of needle thread, said thread acts upon the rear ends of the wings 175 and moves them outwardly away from the sides of the shuttle, thus moving the forward ends inwardly to engage the ribs 169 as before, thus supporting the shuttle as at first.

When the shuttle is fully thrown and stopped, the continued pull of the needle draws the loop of needle thread against the rounded end of the shuttle and the arm 172 and moves the shuttle forward in the swinging wings 175 to the position shown in Figs. 27, 28, 36 and 37. The needle thread passes clear of the shuttle carrying with it the shuttle thread and leaving the shuttle supported by the wings 175 which act to restrain the farther forward movement of the shuttle. By this construction of mechanism, it will be noted that the shuttle is always supported at three, four or five points, which are freely changed by the passage of the needle thread, and which present no impediment to the throwing of the shuttle. The arms 173 of the shuttle carrier are arranged in close proximity as shown in Fig. 12 to form a guide for the hook 144 of the looper and the pin 157 is fixed in said arms to engage with said hook and operate as before described. Opposite the arms which carry the shuttle, on an arm 177$^a$ is the bearing 177 (see Figs. 12 and 13) in which is mounted the spindle of a cam 178, which controls the vertical movement of the pincers. The spindle of the cam 178 swings in the bearing 177 and fixed to the outer end of said spindle is the lever 179 (see Figs. 12, 13, 14, 15 and 16) which engages a shoulder formed in the hub 171 of the shuttle carrier by cutting away the latter as shown by dotted lines in Figs. 13, 15 and 17. A coiled spring 180 tends to rotate the cam 178 from left to right about its axis in the bearing 177, but this movement is limited by the lever 179. By the above described arrangement the cam 178 is rendered operative upon the pincers during the retracting movement of the shuttle and while the same is at rest, thereby holding the pincers down against the needle, but during advance of the shuttle the cam turns on its spindle against only the resistance of the spring 180 and passes idly over the pincers.

In Fig. 17 the parts are shown with the cam partly turned on its spindle, the lever 179 being out of contact with the shoulder.

The shuttle carrier is fixed to one end of the shaft 181, (see Fig. 18) which shaft oscillates in and passes through the shuttle stand 119 and fixed to the other end of this shaft is the pinion 182 carrying a cam 155. The pinion 182 meshes with the toothed segment 183 (see Figs. 1ª, 5 and 29) and the hub of the segment is held between the bearing 184 on the shuttle stand and the bearing 185 on the sliding frame, whereby the segment 183 is caused to move forward and backward with the sliding frame. The hub of the segment 183 is fitted to slide on and turn with the rocker shaft 186, (see Figs. 1ª and 29) and the shaft is fitted to turn in a bearing 187 on the stationary frame 84, but restrained from longitudinal movement in said bearing.

Outside of the bearing 187 there is fixed on the rocker shaft 186, the rocker arm 188 connected by link 189 with the swinging lever 190 which is fulcrumed at 191 to the fixed frame, and which carries a cam roll 192 which engages with the lower cam groove of cam 193 on the shaft 100. A rotation of cam 193 acts through the lever 190 and the link 189 to oscillate the shaft 186 which oscillates the segment 183 and by means of the pinion 182 and cam 155 actuates the shuttle and looper as before described.

An elastic presser foot 194 (see Figs. 20, 24, 44 and 45) is secured to the outer end of the shuttle carrier, the bent end of which is arranged to hold the farther side of the upper, or the side opposite to that which is being operated upon, so that the point of the needle will clear the same when the first side is being operated upon. The presser foot comprises a thin piece of spring metal the lower end of which is inturned and provided with a laterally projecting finger 194ª.

The drawing of the upper around the sides of the last is performed by the pull or tension of the needle thread. If this tension were the same during the whole operation, the side of the upper first acted upon would be drawn out of position, inasmuch as the other side would be held only by the clamps of the heel and toe. To preserve the position of the upper on the last and at the same time draw it tight and properly shape it to the last, the thread tension device is constructed so that it will permit the formation of a predetermined number of stitches under a light tension and automatically increase the tension during the formation of the remainder of the stitches in a given piece of work, whereby the first side of the upper will be lasted and stitched without disturbing its position on the last, and the other side will be tightly drawn and stretched to fit it to the last. This result is accomplished in the machine of the drawings by the following mechanism.

The tension device is mounted upon the stud 196 which is fixed on the swinging frame 97. The tension device comprises a disk 204 and a spring guard 203 between which the thread is held, and to prevent the thread from drawing too deep between the contacting faces of the disk 204 and the spring guard 203, the top of the guard 203 has a projecting flange or ring 205 which fits a corresponding annular groove in the underside of the disk 204, and tongues 206 upon the ring 205 engage slots 206ª in the disk 204, so that while the disk and guard are permitted to have a slight relative movement toward and from each other, they are held to rotate together upon the stud 196 as they are turned by the action of the needle thread. Above the disk 204 is a disk 207 which is splined upon the stud 196 and upon the outer end of the stud 196 is a thumb screw 208 which adjusts the disk 207 and the tension device along the stud 196 and controls the pressure of the springs 201 and 202. These springs 201 and 202 are coiled springs which surround the stud 196 between the guard 203 and a disk 197 which in connection with a ratchet plate 195 automatically varies the tension on the needle thread as will be described. The springs 201 and 202 are of different strength, the spring 201 being a light spring and spring 202 being a heavy spring and they are arranged to act upon the guard 203 in such manner that during the formation of a portion of the stitches the spring 201 acts alone, and during the formation of the balance of the stitches, spring 202 will be brought into use. Below the guard 203 is a disk 198 which is splined upon the stud 196, and a thin ring 199 is fitted to the outside of the disk 198 where the loose keys 200 hold it so that it can move relatively to the disk 198 but cannot turn.

The light spring 201 bears at its upper end against the thin ring 199, and the strong spring 202 bears at its upper end against the disk 198, and both springs at their opposite ends bear upon the disk 197. The disk 197 has upon its lower side the beveled projections 197ª and the ratchet wheel 195 has similar projections 195ª upon its upper face, the ends of these projections being flattened or squared off as shown in Fig. 53. The inclines of the projections 197ª and 195ª are such that when the inclines are in contact, the movement of the ratchet one full tooth will cause the inclines to ride upon one another and raise the disk 197, thereby compressing the strong spring 202. This movement is sufficient to bring the squared ends opposite each other in contact so that the ratchet cannot slip back and the movement of the next tooth will bring the squared ends in the position shown in Figs. 6 and 53.

While the disk 197 is in the position shown in Figs. 32 and 34, that is, with the end of the projection 197$^a$ out of contact with the projection 195$^a$, the light spring 201 only, is exerting tension upon the guard 203 and disk 201 and therefore the needle thread is under a light tension but when the ratchet has been brought to the position shown in Figs. 6 and 53 with the squared ends of the projections 197$^a$ and 195$^a$ in contact thus lifting the disk 197, the strong spring 202 is brought into operation and increases the tension upon the needle thread, the result being that when the operation of lasting is being performed along one side of the shoe, the upper is stitched in position under a light tension, and when lasting along the other side of the shoe the tension is increased, so that a strong stretching action will be imparted to the upper to properly fit it to the last. The ratchet 195 is turned step-by-step to vary the tension by a pawl 210 mounted at 209 upon the needle bar 105, and a spring 211 connected at one end to the pawl and at its opposite end to a fixed stud 211$^a$, acts to hold the rear end of the pawl against the pin 212 fixed in the needle bar.

The pawl 210 engages with the teeth of the ratchet plate 195 when the needle bar and needle are being moved back, and turns the ratchet plate, the movement of the ratchet ending with that of the needle bar, and at the end of the stroke the pawl and ratchet will be in the position shown in Fig. 34. When the needle bar moves forward or toward the work the spring 211 yields and the pawl 210 swings past the next tooth of the ratchet, when the spring 211 again acts to set the pawl in contact with the pin 212 to again turn the ratchet plate on the backward movement of the needle bar. Each tooth of the ratchet wheel represents a light tension stitch upon the side of the upper first operated upon, and this wheel is made large enough to have two sets of teeth, each representing the number of light tension stitches required for the largest shoe upper ever made, with a blank space 195$^b$ between each set of teeth.

To set the ratchet wheel 195, it is turned by hand the requisite number of teeth, so that the remaining number of teeth between the pawl and the blank space is equal to the number of light tension stitches it is desired to make on the first side of the upper operated upon. Until the pawl 210 has moved the ratchet wheel to the point where the blank space in the ratchet wheel is reached, the stitches will be formed under a light tension, but when the blank space has been reached, the projections 195$^a$ and 197$^a$ are brought into contact, thus bringing into action the strong spring 202 when the remaining stitches, or those around the toe upon the other side of the shoe and around the heel will be formed under a heavy tension, and this condition is maintained until all the stitches in the shoe then being operated upon have been formed, the ratchet wheel 195 remaining set because the blank spaces renders the pawl inoperative to actuate the ratchet, until the ratchet is again turned and set by hand. It will thus be seen that any desired number of stitches may be sewed under a light tension and that at a predetermined point, the tension upon the needle thread will be automatically increased to exert a strong pull upon the upper to properly stretch and set it to the last.

As before stated, the needle bar 105 is reciprocated in the angular guides 214 mounted upon the swinging frame. A thread guide 215 is fixed to the angular guides and leads the thread from the spool to the tension device, and from the tension the thread is led to the take up and from the take up to suitable guide rolls which lead the thread to the back of the needle. The take up is preferably arranged as follows: As shown in Figs. 6 and 9, guides in which the needle bar is reciprocated are extended rearwardly and above the face of the needle bar thus forming a guideway above the needle bar in which is arranged the take up 216. Upon the take up 216 is fixed the thread roll 217 around which the needle thread passes. The take up is arranged to be actuated by the reciprocating needle bar 105. When the needle bar moves forward the thread overhauls on the thread roll 217 at the same time drawing the take up 216 in the same direction, the take up giving up its thread to the needle without moving the tension device. When the needle bar 105 and needle move away from the work, at the proper time, a pin 218 set in the needle bar engages with the take up and moves it back to its starting position, thus bringing the thread taut and the tension device into operation to draw and set the stitch.

219 and 220, see Figs. 6, 16, 32 and 34, represent grooved thread rolls which are fitted in a slot 221 cut through the needle bar 105 over which the thread leads from the front to the back of the needle bar and thence to the eye of the needle. The needle is shown in Figs. 38 and 39 and is preferably a long flexible needle having a curved point of very short radius, and is held in the needle bar by a set screw 222, see Fig. 34.

The machine has means for slitting and trimming the edge of the upper just before that portion of the upper which is being acted upon is turned down and lasted. This mechanism comprises a knife 223 which is carried upon the outer end of the needle bar 105, and acts upon the upper at the termination of the forward movement of the needle bar. The knife 223 is arranged to cut a vertical slit in the edge of the upper close to the inner sole, and also to trim off all extra stock from the edge thereof, leaving a small section of the edge of the upper free for the thread to draw close to the innersole, and leaving that portion of the edge of the upper in advance of the slit standing at about a right angle to the face of the innersole, ready for the pincers to close upon it for the next operation, as in Fig. 12.

The preferred form of cutting knife for ordinary work is shown in Figs. 40 and 54, and has two cutting edges arranged at right angles to each other, one edge of which makes the vertical slit and the other trims off the surplus stock, the edge which trims off the surplus stock being of such a length as to trim the upper at each reciprocation for a slightly greater distance than the length of the longest stitch the machine will make, the cutting edge which slits the upper being of a length to properly slit the same and slitting the upper just in advance of the needle. The cutting edges of the knife 223 are also preferably sheared from the ends to the corner or angle. For very thick uppers, or where it is desired to attach the welt at the same time the upper is being lasted, the short member of the edge of the knife is composed of two parts arranged at an acute angle so as to cut a nick out of the stock each time, so that the sections of the toe of the upper and the welt, will lay fair upon the innersole instead of overlapping.

The modified form of knife is shown in Fig. 41.

A spring 215ˣ is attached to the top of the thread guide 215, and the stationary frame 84, by the standard 84ˣ, which acts to some extent to draw the sliding frame 86 forward and also to counterbalance the weight of the sliding frame, and its connections and attachments. Were the weights 87 heavy enough to cause the side guides 89 to swing the jack by contact with the sides of the last, the manual operation thereof would be very laborious, and the side guides 89 by their continued heavy pressure would indent the upper so deep that it would be almost impossible to finish said upper and remove the marks of the side guides therefrom.

By the arrangement described the jack is caused to assume a proper position with relation to the side guides by the pull of the needle, which as it pulls back upon the needle thread, the final pull on the thread against the tension device causes the last to be strongly drawn toward the side guides and thus swings the last and jack to the desired position relative to the securing devices and for the next stitch, the jack feed mechanism stopping its action just before the final pull is given to the needle thread.

If the sliding frame 86 were held in position by the weights 87 only, the action of the needle upon the upper and innersole would cause the frame 86 to have a tendency to be pushed away from the upper at each forward movement of the needle, and the action of the needle upon the upper and innersole would thus cause the side guides to hammer upon the upper and thus indent and mar the appearance of the same. To prevent this the sliding frame is clamped in position and only released during the feeding and tension drawings of the needle thread by a clamp which is preferably arranged and actuated as follows: The clamp 224, see Figs. 5 and 6, shown as a double ended lever is pivoted at 225 to one side of the stationary frame in such manner that its operative face will engage with one of the edges of the sliding frame 86. The other end of the lever is connected to a rod 226, the end of which is adjustably connected to the lever 227 fulcrumed at 228 to the stationary frame. The opposite end of the lever 227 carries a roll 229 which engages a cam 230 fixed on the cam shaft 100, the arrangement being such that at the proper times the lever 227 will be actuated to operate the clamp 224 through the rod 226 to lock and release the frame 86.

In assembling the upper and last in the jack, after the heel clamps have been brought in contact with the heel end of the last, the upper is stretched lengthwise by hand operated pincers applied at the toe end of the upper, and when the toe clamps have been brought into clamping contact with the toe of the last, the upper will be held under tension lengthwise between the heel and toe clamps. This endwise tension prevents the stitches of light tension on the first sewn side of the upper from drawing that side of the upper out of position with reference to the medial line of the last.

When the welt is to be sewn on at the same time the upper is lasted, the number of stitches at the sides of the last between the end clamps is about doubled, which will make it necessary to increase the number of teeth of the ratchet of the variable tension device. If this is done without increasing the diameter of the ratchet wheel in equivalent ratio, the teeth would be too fine, and the movement of a single tooth would not bring the ends of the projections 195ᵃ and 197ᵃ into contact to increase the tension as before described, but would allow the inclined sides of the projections to rest upon each other and act to move the ratchet 195 back and cause the pawl 210 to act constantly upon the same tooth of the ratchet. To remedy this a retainer pawl 240 is mounted so as to act upon the teeth of the ratchet 195 in the usual manner of such devices and prevent the reverse movement due to the action of the inclined sides of the projections 195ᵃ and 197ᵃ upon each other.

The operation of the machine is as follows: The upper having been drawn on to the last and the last and upper properly jacked and held by the end clamps as described, the latch 10 is lifted to permit the springs to elevate the jack to bring the innersole in contact with the holding guides 90 and 91 and the sides of the last against the side guides 89, the latch 118 having been raised and the sliding frame 86 moved forward as before described. This upward movement of the jack has brought the projecting edge of the upper between the open jaws of the pincers, the last and jack being so positioned that the pincers will engage the upper and the stretching and securing of the upper will commence at the shank of the shoe near the end of the heel clamp, the direction of feed of the jack being from heel to toe. The turned up edge of the upper is now preliminarily slit by hand upon the side of the pincers nearest the heel clamp at such distance from the pincers that the slit made upon the other side of the pincers by the knife on the needle bar will make the section of upper thus cut substantially equal to the sections which will be thereafter cut by the reciprocating knife. If the hand operating mechanism be present, although not essential the machine is started by hand, such operation causing the swinging frame to rise and move forward toward the last closing the pincers upon the section of the upper then between them. At the same time the swinging frame is moving upwardly and toward the last, the needle bar is being moved forwardly toward the last. When the swinging frame has reached its forward position, the identor has been driven into the upper face of the insole forming an indentation therein, and the cam 178 has depressed the outer ends of the pincers and the point of the needle is almost in contact with the edge of the upper, the body of the needle being guided by the groove in the lower pincer jaw. As the needle bar continues to move forward the point of the needle passes through the upper and as it moves toward the innersole, the cam 178 acts upon the pincers and forces them down thereby moving the upper and needle toward the bottom of the last. This bends the shank of the needle and causes its point to engage the base of the indentation formed in the innersole as in Fig. 16. Upon the further operation of the machine the swinging frame commences to move downwardly and backwardly whereby the point of the needle as it is advanced will be caused to enter and emerge from the upper face of the insole forming a loop of the material of the insole upon the face thereof. When the needle is moved fully forward as in Fig. 19, the ends of the needle and shuttle thread are knotted together, or otherwise fixed and drawn close to the innersole. The forward movement of the needle has brought the needle thread into position to be engaged by the looper and the knife mounted upon the needle bar has slit and trimmed a section of the upper, as before described. When the needle commences to recede, the looper 139 engages the needle thread and draws it from the needle holding it open and in the form of a loop through which the shuttle then passes as shown in Figs. 25 and 28. During the latter part of the backward movement of the needle bar and needle, the needle bar acts upon the take up device which in connection with the tension device exerts a pull on the thread to take up the slack, set the stitch and draw the upper over the edge of the last and close to the face of the innersole. The awl which was inserted to hold the innersole in position is now withdrawn and the machine either further operated by the hand device or the shipper lever 65 is raised to allow the sliding clutch 70 to interlock with the belt pulley and operate the machine by power. The operation of slitting, trimming and drawing and uniting the upper to the inner sole is continued with a light tension upon the needle thread until the feed of the jack has brought the toe clamp in contact with the edge guides, or nearly so, at this point the needle bar has acted upon the tension device to cause an increased tension upon the needle thread, the stitches now being formed under a heavy tension until the upper has been completely lasted and united to the insole, at which time the machine is stopped automatically as before explained. When the toe of the last is passing the side guides the guides bear upon the outer sides of the end clamps, which are made thicker at the center than at the sides, to preserve the uniformity of the distance of the stitch from the edge of the innersole.

As hereinbefore described, the width of the sections of the edge of the upper at the toe is governed by the distance of the end of the toe from the center around which it swings. These sections are made quite narrow, about one fourth of an inch and as these sections are drawn in, the result is similar to what is called in the hand lasting process, "shingling" as in Fig. 29. By the action of the heavy tension, the toe of the upper, being divided in such small sections, is drawn very close to the last, for as one stitch draws a section of the upper almost to its limit of strength, it also draws the succeeding section forward, and the next stitch gains a small increment of stock. In lasting a very small toe after the first one or two stitches are formed, the stitches around the toe will intermesh with each other, and the strain of drawing the upper over the edge of and down on the face of the innersole is resisted by the stitches as well as by the leather of the innersole. After the feed of the jack has turned the last at the toe so as to present the opposite side of the last to the lasting and sewing devices, the true side lasting process commences, the tension on the needle thread being automatically increased and an extra strain being applied to the upper which is thus caused to conform accurately to the shape of the last, each stitch formed upon the second side of the shoe after the jack is turned operates to draw upon a small band like section of the upper which is secured to the other side of the innersole, and draws this section close around the last, at the same time drawing the next section well up. When the heel clamps reach the side guides, the jack again swings and the stitching is continued until the starting point is reached, when the machine stops, with the upper drawn around the last and secured close to the innersole and all superfluous stock removed. When the machine is stopped, the jack is depressed and the sliding and swinging frames are returned to their retracted positions.

It is to be noted that the operation of lasting by the present machine is to be clearly distinguished from the hand lasting process, in which manually operated pincers are used to draw the upper around the last by pulling upon two or three places upon each side of the shoe, which results in the upper being overstrained at some points and not strained at all at others, whereas in the process as carried out in the present machine, the upper is equally drawn to conform to the last at all points. When thin innersoles are used in lasting, the bottom of the last should be grooved as in Fig. 44 to allow the indentor to move or displace the leather under its point instead of compressing it or driving it into the bottom of the last. If it is desired to sew on the welt at the time the upper is lasted, the knife shown in Fig. 41 is substituted for the knife shown in Fig. 40 and the feed is reduced to reduce the length of the stitches as desired. The guide stand 88 also is modified by being shortened to the extent of the thickness of the welt, and a welt guide 231, see Figs. 18, 42 and 43 is attached to the end of the sliding frame, and a portion of the jaw 122 of the pincers is removed as in Fig. 19, to allow the edge of the welt to pass under the point of the needle sufficient to hold the stitch. The welt strip is led from the guide 231 under the side guides and its end is positioned and started when the first two stitches are made, and when once started it follows the shoe and is attached with the edge of the upper, the knife cutting small nicks in the edge of the welt which enables it to follow the curves of the innersole easily. If it is desired to sew the welt on all around the insole the starting and stopping mechanism of the machine is unchanged, but if the welt is only sewn on the shank and forward part of the insole, an extra stop space is made in the base plate of the jack to allow the operator to cut the welt strip at the desired point.

It will be noted that in lasting by my improved machine, the assembling of the last, upper and innersole, and the jacking thereof can be easily and quickly accomplished, that the lasting operations are mostly mechanical and require but little labor on the part of the operator and are practically uniform in all shoes each upper being accurately conformed to the last. It is further to be noted that the surplus stock in the edge of the upper is trimmed off leaving the surface of the insole in condition to receive the outer sole. The innersoles do not have to be channeled, the use of tacks is obviated and metal bottomed lasts unnecessary.

The term "free floating jack" where used in the claims, denotes a jack free to move in any direction in a horizontal plane under the influence of its feeding mechanism and retained in place on its support by gravity.

I claim—

1. The combination, with means for positioning a shoe, comprising an upper and insole on a last, of stitch-forming mechanism including a needle, and means for actuating the needle operating to cause the needle to penetrate the margin of the upper and enter the upper surface of the insole, raise a loop therefrom and emerge from the same surface, and angularly displace the needle to draw the thread through the loop and the margin of the upper, substantially as described.

2. The combination, with a needle having a straight shank and a curved and pointed tip, of means for causing the tip of the needle to penetrate the surface of an insole while the shank is inclined upwardly, acting to swing the shank downwardly during the passage of the tip through the insole surface so as to cause the tip to move in a curve conforming to the curvature of the tip and raise a loop of the insole material on its surface, substantially as described.

3. The combination of lasting mechanism acting to secure the upper of an unlasted shoe to an insole, means to trim the margin of the upper, and pincers to seize the margin of the upper extending beyond the insole and hold it for the operation of said trimming means, substantially as described.

4. The combination of sewing mechanism including means for piercing the margin of the upper of an unlasted shoe for the reception of the stitch, a knife for trimming the margin of the upper, said upper piercing and trimming means being mounted on a common carrier, and pincers to seize the upper and hold it for the operation of said knife, substantially as described.

5. The combination of a needle bar and needle, angularly movable guides in which the needle bar reciprocates, and connected mechanism for simultaneously advancing the needle bar in the guides and moving the guides angularly, substantially as described.

6. The combination with a needle and complemental stitch forming devices and their actuating means, of a swinging frame carrying said needle, means to swing said frame and an extensible connection between the needle and its actuating means, arranged to yield to the movement of the frame, substantially as described.

7. The combination with a jack or last support, of a sliding frame mounted to move toward and from the jack, inclined guides upon the sliding frame, a swinging frame supporting a needle and complemental stitch forming mechanism, supported and guided by the inclined guides, and a cam and connecting mechanism to actuate the swinging frame, substantially as described.

8. The combination with a needle and complemental stitch forming mechanism and sliding and swinging frames carrying the same, of a bearing fixed upon the swinging frame, a crank shaft mounted in the bearing, a needle bar connected with the crank shaft, a fixed cam, and suitable connections between the crank shaft and fixed cam, substantially as described.

9. The combination with means for forming indentations in the sole of a shoe, of mechanism for forming loops of the substance of the upper surface of the sole at each indentation, and mechanism for inserting upper-securing fastenings in the loops, substantially as described.

10. The combination with an indentor for forming indentations in the sole of a shoe, of a needle and complemental stitch forming devices, said needle arranged to enter such indentations and form loops of the substance of the sole on the surface thereof, substantially as described.

11. The combination with an indentor for forming indentations in the sole of a shoe, of a needle for striking up loops of the substance of the sole at and inside of such indentations, means to alternately actuate the indentor and needle, and complemental stitch forming devices coöperating with the needle, substantially as described.

12. The combination with an indentor for forming indentations in a shoe sole, of a needle for striking up loops of the substance of the sole on the surface thereof, mechanism for actuating said needle arranged to cause it to penetrate the shoe sole at the base of such indentations and to emerge from the upper surface thereof at a point adjacent such indentations, and complemental stitch forming devices coöperating with the needle, substantially as described.

13. The combination with an indentor for forming indentations in a shoe sole and means for forming stitches in said indentations, of a spring for normally maintaining the indentor in an elevated position, a hammer for depressing the indentor, and means actuated by the machine for operating said hammer, substantially as described.

14. The combination with stitch forming devices, of an indentor for forming indentations to receive the stitches in a sole of a shoe, a hammer to depress the indentor, mechanism to raise the hammer at the desired times during the operation of the machine, and an adjustable, spring, actuating mechanism to cause the hammer to strike a quick and sharp blow upon the indentor, substantially as described.

15. The combination of an indentor for forming indentations in a sole of a shoe, a swinging-spring-operated hammer, a clutch member fixed to the hammer arm, a swinging arm with a coöperating clutch member thereon acting to raise and release the hammer, a swinging frame carrying lasting mechanism, and means carried by the swinging frame, arranged to trip said arm in its forward movement, substantially as described.

16. The combination with an indentor for forming indentations in a shoe sole, of a reciprocating frame carrying lasting devices, and connections between the reciprocating frame and the indentor for actuating the indentor upon the reciprocations of said frame, substantially as described.

17. The combination with a jack or last support, of an indentor for forming indentations in a shoe sole, a needle and complemental stitch forming devices, a swinging frame carrying the needle, movable toward and from the jack, means for actuating the swinging frame and means actuated by the swinging frame for actuating the indentor, substantially as described.

18. In a lasting machine a pincer mechanism arranged to engage and hold the projecting edge of the upper, the pincer mechanism comprising a pivoted jaw member, and a longitudinally movable jaw member, links connecting said members, means to retain the pincer members normally open, and means to move the latter member longitudinally to close the pincers to grip the upper at intervals, substantially as described.

19. The combination of stitch forming devices comprising a shuttle, pincers arranged to grip the edge of the upper, means to actuate the pincers to grip the edge of the upper at intervals, means to actuate the shuttle, and connections between the shuttle actuating mechanism and the pincers to depress the pincers as the shuttle is actuated, substantially as described.

20. The combination of stitch forming mechanism comprising a shuttle, pincers arranged to grip the upper, and a cam actuated by the shuttle mechanism arranged to bear upon said pincers to force the same toward the sole, substantially as described.

21. The combination of a reciprocating element for inserting the fastening means for securing the upper to the sole, and a pincer mechanism for holding the edge of the upper actuated directly by said reciprocating element, substantially as described.

22. The combination with an indentor for forming indentations in a shoe sole, of pincer mechanism for gripping the upper, and a guide carried by the pincer mechanism for locating the indentor with reference to the edge of the sole, substantially as described.

23. The combination with an indentor for forming indentations in a shoe sole, and a support therefor, of pivoted pincer mechanism for gripping the upper, a guiding connection between the indentor and pincer mechanism, and a pivoted connection between the indentor and its support, substantially as described.

24. The combination of means for positioning a shoe, comprising an upper and an insole on a last, means for trimming the margin of the upper, and means for subsequently securing the upper to the insole, substantially as described.

25. The combination of means for positioning a shoe, comprising an upper and an insole on a last, stitch forming devices comprising a reciprocating needle and its carrier, and a knife for acting upon the edge of the upper actuated by the needle carrier, substantially as described.

26. The combination with lasting mechanism acting to secure the upper of an unlasted shoe to an insole including a needle and a needle carrier, of a slitting knife for slitting the margin of the upper a short distance in from its edge carried and actuated by the needle carrier, substantially as described.

27. The combination with lasting mechanism acting to secure the upper of an unlasted shoe to an insole, of a reciprocating knife arranged to trim and slit the edge of the upper, substantially as described.

28. The combination of mechanism for slitting and trimming the edge of the upper of an unlasted shoe, and lasting devices arranged to draw the upper over upon and to secure it to the sole, substantially as described.

29. The combination of pincers for holding the margin of the upper, a knife for slitting the edge of the upper, and mechanism for actuating the pincers and the knife, operating first to close the pincers upon the upper and subsequently to cause the knife to engage and slit the upper, substantially as described.

30. The combination of pincers for holding the margin of the upper, a knife for trimming the edge of the upper, and mechanism for actuating the pincers and the knife, operating first to close the pincers upon the upper and subsequently to cause the knife to engage and trim the upper, substantially as described.

31. The combination of stitch forming devices comprising a reciprocating needle, its carrier, and upper-holding devices, and an upper-slitting knife actuated by the needle carrier, substantially as described.

32. The combination of a welt guide and lasting mechanism arranged to draw and position the edge of the upper over the last and to position the welt and simultaneously secure the upper and welt to the insole, substantially as described.

33. The combination of lasting mechanism acting to position and secure the upper and a welt to the insole, and mechanism to trim the margin of the upper, substantially as described.

34. The combination of lasting mechanism acting to position the upper and a welt and secure them to the insole, and mechanism to slit the margin of the upper, substantially as described.

35. The combination of lasting devices comprising upper slitting and trimming mechanism, stitch-forming mechanism, and a welt guide, substantially as described.

36. The combination, with a needle and mechanism for reciprocating the needle, of a sliding and swinging frame upon which the needle and actuating mechanism are mounted, and a shuttle and actuating mechanism therefor, mounted to oscillate upon the sliding frame at right angles to the line of reciprocation of the needle, substantially as described.

37. The combination, of stitch forming mechanism comprising a needle arranged to draw and secure the edge of the upper to the sole, and a presser foot arranged to engage the upper at the opposite side of the sole from the side at which the needle is working and remove it from the path of movement of the needle, substantially as described.

38. The combination, of stitch forming mechanism comprising a needle, a looper, and mechanism to impart to the looper a swinging movement toward and from the path of the movement of the needle, and a vertically movable support for the looper, substantially as described.

39. The combination, with the needle, of a looper arranged to have swinging movements in planes at right angles to each other, and also a vertical movement, and means to actuate the same to produce the several movements, and complemental stitch forming devices coöperating with the needle and looper, substantially as described.

40. The combination, with the needle, of a looper, a vertically movable oscillating stem upon which the looper is mounted, means to elevate and oscillate said stem, and a spring to depress the stem, and complemental stitch forming devices coöperating with the needle and looper, substantially as described.

41. The combination, with a looper and a swinging arm upon which it is mounted, of a spring and stop to hold the arm in its normal position, a sliding and turning rod for supporting the arm and looper, a fixed bearing within which the rod is arranged to slide, a guide slot in the bearing, a guide fixed to the sliding and turning rod arranged to engage with the guide slot when the sliding rod is elevated, a roll mounted on the slide rod, a swinging lever arranged to engage the said roll to elevate the sliding rod, means for actuating the swinging lever, complementary inclines carried by the slide rod and lever arranged to swing the looper, and a spring arranged to depress the slide rod, substantially as described.

42. The combination, with a reciprocating needle, of a looper arranged to engage the needle thread and form a loop thereof, a shuttle, mechanism to actuate the shuttle to pass it through the loop of needle thread, and means on the shuttle carrier to disengage the looper from the loop of needle thread, substantially as described.

43. The combination, with a reciprocating needle and its carrier reciprocating in suitable guides, of a tension device to act on the needle thread, and a take-up independent of the needle carrier, movable in the needle carrier guides, and arranged to be engaged and actuated by the needle carrier, substantially as described.

44. The combination, with means for positioning a shoe, comprising an upper and an insole on a last, of a sliding frame movable toward and from the last, a side guide on said frame, means to normally maintain the side guide in contact with the last, a reciprocating fastening-inserting element on the frame, and a latch and actuating devices therefor, arranged to lock the sliding frame during the action of the reciprocating fastening-inserting element, substantially as described.

45. The combination, with means for positioning a shoe, comprising an upper and an insole on a last, of a sliding frame carrying lasting devices, means to normally move the frame toward said last and a latch to hold the frame in its retracted position, substantially as described.

46. The combination, with a sliding frame carrying suitable devices to prepare the edge of the upper for lasting, of a sliding and vertically movable frame carrying a reciprocating fastening-inserting element, and suitable guide connections between said sliding frame and the sliding and vertically movable frame, substantially as described.

47. The combination, with a last or work support and a free floating jack supporting the same, of lasting devices comprising stitch forming mechanism, a feeding mechanism for the jack arranged to move the last past the lasting devices, and to permit the jack to freely swing to properly position the curved sides of the last relatively to the lasting devices, and suitable guides against which the sides of the last are drawn as the stitch forming devices are operated to set a stitch, substantially as described.

48. The combination, with a free floating jack, of a feeding mechanism therefor, suitable lasting devices, and a side guiding device to act on the last on the jack to swing the floating jack to cause the last to assume a proper position relative to the lasting devices, substantially as described.

49. The combination, with a jack or last support, and longitudinally adjustable end clamps to clamp the upper thereon, of stitch-forming devices, and connected mechanisms operating automatically to impart to the jack or last support and stitch-forming devices relative movements to bring successive portions of the edge of the upper under the action of the stitch-forming devices, said end clamps being constructed and arranged to engage the upper in such a location relative to the bottom of the last as to permit a free operation of the stitch forming devices, substantially as described.

50. The combination, with a jack or last support, and independent longitudinally adjustable end clamps to clamp the upper thereon, of stitch-forming devices, and connected mechanisms operating automatically to impart to the jack or last support movements past the stitch forming devices to bring successive portions of the edge of the upper under the action of the stitch forming devices, said end clamps being constructed and arranged to engage the upper in such a location relative to the bottom of the last as to permit a free operation of the stitch forming devices, substantially as described.

51. The combination, with means for positioning a shoe, comprising an upper and insole on a last, of stitch-forming mechanism including a needle, and means for actuating the needle operating to cause it to enter the upper flat surface of the insole, angularly displace the needle to raise a loop from the surface of the insole and emerge again from the same surface, and draw the thread through the loop so formed, substantially as described.

52. The combination with pincer jaws for seizing the upper of an unlasted shoe and stitching mechanism for securing the upper to the insole, of an indentor movable toward and from the insole for forming indentations in the insole at the point where the upper is to be secured thereto, the pincer jaws being constructed and arranged to guide both the indentor and the needle of the stitching mechanism in their movements, substantially as described.

53. The combination with pincer jaws for seizing the upper of an unlasted shoe, of a reciprocating indentor for forming indentations in the insole, one of said pincer jaws having a groove in which said indentor operates and is guided in its movement, substantially as described.

54. The combination with an indentor for forming indentations in a shoe sole, and means for normally holding said indentor in an elevated position, of stitching means including a movable needle carrier, and a hammer for depressing the indentor controlled by the movement of said carrier, substantially as described.

55. The combination of sewing mechanism for lasting the upper of an unlasted shoe and securing it to the insole, including means acting to lay the margin of the upper against the insole, of pincers to seize the edge of the upper and hold it in position for the operation of said lasting and securing mechanism, and means for operating said pincers, substantially as described.

56. The combination with stitch forming mechanism for drawing the upper close to and sewing it to the surface of the sole, of a variable tension device for the needle thread, means to set the same for sewing along one side of the shoe under a comparatively light tension, and means operating automatically to increase the tension while sewing along the other side of the shoe.

57. The combination with a needle, of a variable tension device for the needle thread, means to set the same for sewing one or more stitches with a comparatively light tension, and means operating automatically to increase the tension at any desired point during the sewing operation.

58. The combination with stitch forming mechanism of a tension device for the needle thread operating to exert a certain tension on the thread during the formation of a series of stitches, and means acting automatically to change the tension upon the thread to cause succeeding stitches to be produced under a different tension.

JOS. E. CRISP.

Witnesses:
M. J. CRISP,
E. L. PIERCE.